United States Patent
Ohashi et al.

(10) Patent No.: US 10,873,487 B1
(45) Date of Patent: Dec. 22, 2020

(54) COMMUNICATION DEVICE, METHOD FOR PREDICTING INTERRUPTION, CONTROL CIRCUIT, AND PROGRAM RECORDING MEDIUM

(71) Applicant: Mitsubishi Electric Corporation, Tokyo (JP)

(72) Inventors: Akinori Ohashi, Tokyo (JP); Masatsugu Higashinaka, Tokyo (JP); Shusaku Umeda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/996,231

(22) Filed: Aug. 18, 2020

Related U.S. Application Data

(63) Continuation of application No. PCT/JP2018/008320, filed on Mar. 5, 2018.

(51) Int. Cl.
*H04L 27/156* (2006.01)
*H04B 7/185* (2006.01)

(52) U.S. Cl.
CPC ......... *H04L 27/1566* (2013.01); *H04B 7/185* (2013.01)

(58) Field of Classification Search
CPC ............... H04B 7/185; H04B 7/18502; H04B 7/18506; H04B 7/18508; H04L 27/1566
See application file for complete search history.

(56) References Cited

U.S. PATENT DOCUMENTS 7,656,933 B2 * 2/2010 Klinke ................... G10L 21/02
375/144
9,306,718 B2 * 4/2016 Walton ..................... H04L 1/00
2010/0330926 A1 * 12/2010 Monk ................. H04B 7/18506
455/67.15
2012/0294384 A1 * 11/2012 Wilcoxson ............ H04L 1/0034
375/285
2013/0246884 A1 * 9/2013 Lee ........................ H04L 1/0009
714/755

FOREIGN PATENT DOCUMENTS

| JP | 5-167344 A | 7/1993 |
| JP | 2503883 B2 | 6/1996 |
| JP | 3339568 B2 | 10/2002 |

* cited by examiner

*Primary Examiner* — David B Lugo
(74) *Attorney, Agent, or Firm* — Birch, Stewart, Kolasch & Birch, LLP

(57) ABSTRACT

A communication device includes a signal determiner determining whether there is a reception signal, and a period estimator estimating an interruption period of interruption of a signal transmitted from a device as a source of the reception signal, using a determination result from the signal determiner. The period estimator includes a differential operator calculating a differential value of the determination result, a masking operator calculating a provisional period of the interruption period using the differential value, controlling use of the differential value and provisional period based on internal state, and outputting the provisional period to be used, a period calculator calculating the interruption period using the provisional period, a signal existing section calculator calculating a signal existing section using the provisional period, a periodic timing estimator estimating periodic timing using the provisional period and signal existing section, and a state determiner determining the internal state using the interruption period.

20 Claims, 24 Drawing Sheets

COMMUNICATION DEVICE, METHOD FOR PREDICTING INTERRUPTION, CONTROL CIRCUIT, AND PROGRAM RECORDING MEDIUM

CROSS-REFERENCE TO RELATED APPLICATION

This application is a continuation application of International Application PCT/JP2018/008320, filed on Mar. 5, 2018, and designating the U.S., the entire contents of which are incorporated herein by reference.

BACKGROUND OF THE INVENTION

1. Field of the Invention

The disclosure relates to a communication device that communicates in an environment in which a communication channel is expected to be interrupted periodically, to a method for predicting interruption, to a control circuit, and to a program recording medium.

2. Description of the Related Art

In an environment in which a signal is interrupted periodically, a communication device undergoes a reduction in communication efficiency as compared to when the signal is not interrupted. An example of situation of communication in such environment occurs in a helicopter satellite communication system. A helicopter satellite communication system is a system in which a helicopter and a terrestrial station communicate with each other via a communication satellite. A signal transmitted from the helicopter to the communication satellite is interrupted periodically by the rotary wing of the helicopter. In addition, a signal transmitted from the communication satellite to the helicopter is also interrupted periodically by the rotary wing of the helicopter. This reduces efficiency of communication performed by a communication device provided in a helicopter as compared to usual communication.

Japanese Patent No. 2503883 discloses a technology in which a flying station installed in a flying object includes a receiver that detects a reception level of a signal received from a stationary station via a communication satellite, and detects, from the reception level at the receiver, radio wave interruption timing on a propagation channel. Upon transmission of a signal to the stationary station via the communication satellite, the flying station transmits the signal when there is no interruption of radio wave, and stops transmission of the signal when there is interruption of radio wave, on the basis of the reception level. In addition, the flying station detects reception timing from the detected reception level, and detects the phase difference between the reception timing and the interruption timing. The flying station informs the stationary station of the phase difference via the communication satellite, and the stationary station transmits a signal only when there is no interruption on the basis of the phase difference. The flying station can communicate at timing when there is no interruption of radio wave due to the rotary wing, and can thus provide efficient communication.

However, in the foregoing conventional technology, the flying station detects interruption timing, reception timing, and a phase difference based on the reception level of a signal received. This causes detection accuracy to be susceptible to an instantaneous change in the reception level, which presents a problem of being incapable of providing highly accurate and stable detection.

The disclosure has been made in view of the foregoing, and it is an object of the disclosure to provide a communication device capable of improving accuracy of estimation of the period, or cycle period, of interruption of a communication channel.

SUMMARY OF THE INVENTION

To solve the problem and achieve the object described above, a communication device according to the disclosure includes a signal determination unit to determine whether there is a reception signal or not; and a period estimation unit to estimate an interruption period of interruption of a signal transmitted from a device that is a source of the reception signal, using a determination result from the signal determination unit. The period estimation unit includes a differential operation unit to calculate a differential value of the determination result, and a masking operation unit to calculate a provisional period of the interruption period using the differential value, to control use of the differential value and of the provisional period based on an internal state representing an operational state of the period estimation unit, and to output the provisional period to be used. The period estimation unit further includes a period calculation unit to calculate the interruption period using the provisional period output from the masking operation unit, and a signal existing section calculation unit to calculate a signal existing section referring to a section in which the reception signal exists, using the provisional period output from the masking operation unit. The period estimation unit further includes a periodic timing estimation unit to estimate periodic timing representing timing of a change, in the determination result, from a section in which the reception signal does not exist to the signal existing section, using the provisional period output from the masking operation unit and using the signal existing section, and a state determination unit to determine the internal state using the interruption period.

DETAILED DESCRIPTION OF THE PREFERRED EMBODIMENTS

A communication device, a method for predicting interruption, a control circuit, and a program recording medium according to embodiments will be described in detail below with reference to the drawings.

First Embodiment

Figure 1:
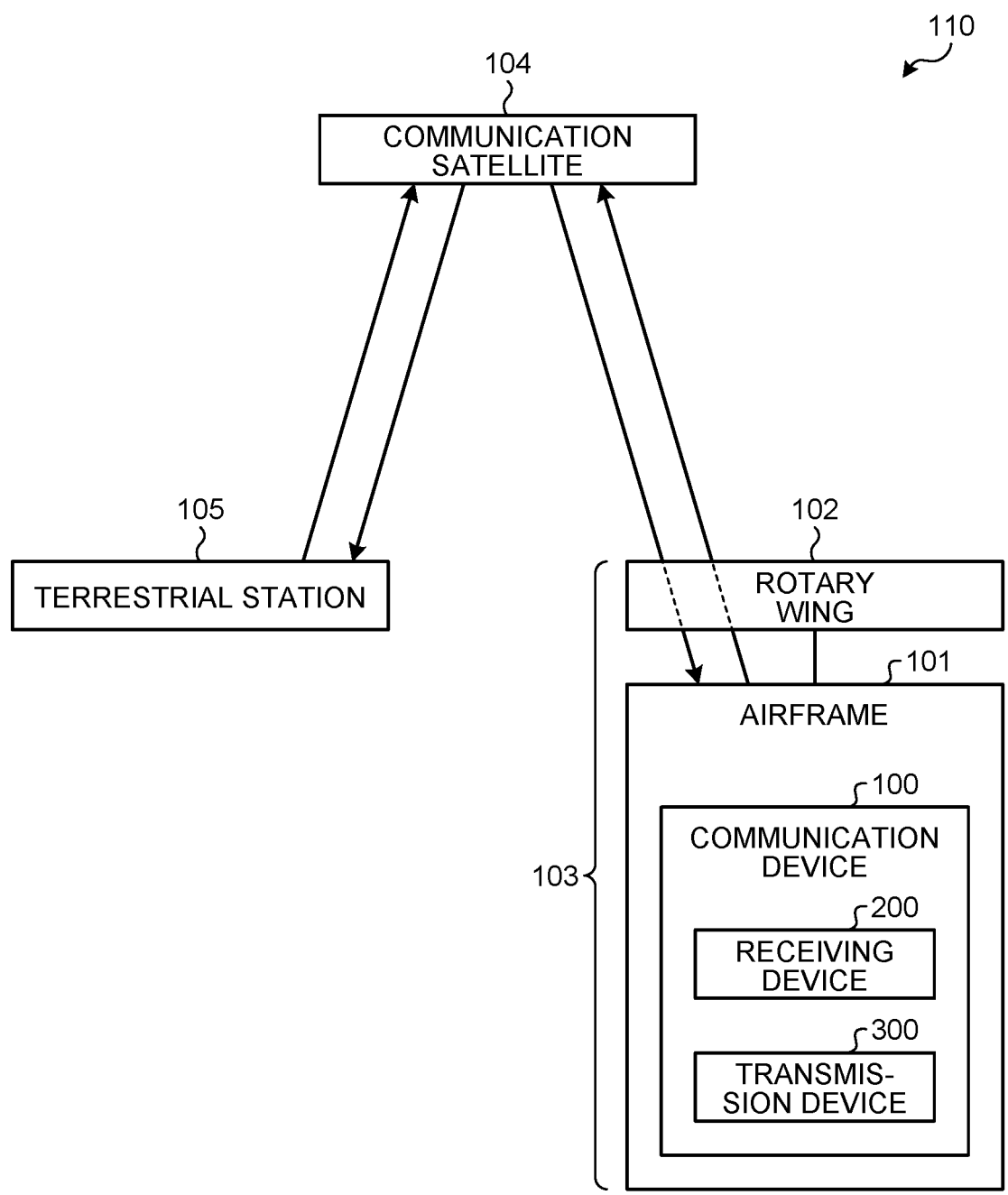
FIG. 1 is a diagram illustrating an example configuration of a communication system according to a first embodiment.

FIG. 1 is a diagram illustrating an example configuration of a communication system 110 according to a first embodiment. The communication system 110 includes a helicopter 103, a communication satellite 104, and a terrestrial station 105. The communication system 110 is a helicopter satellite communication system in which the helicopter 103 and the terrestrial station 105 communicate with each other via the communication satellite 104. The helicopter 103 includes a communication device 100 including a receiving device 200 and a transmission device 300. The helicopter 103 also includes a rotary wing 102 provided on the top of an airframe 101 to provide buoyancy and propelling force. In the communication system 110, rotation of the rotary wing 102 causes the communication channel between the communication device 100 of the helicopter 103 and the communication satellite 104 to be interrupted periodically. Possible examples of communication whose communication channel is interrupted periodically also include communication using a drone, a windmill, or the like, but are not limited thereto. In the present embodiment, the communication device 100 estimates the period, or cycle period, of interruption of the communication channel caused by rotation of the rotary wing 102, and performs communication taking into consideration the period of interruption of the communication channel.

Figure 2:
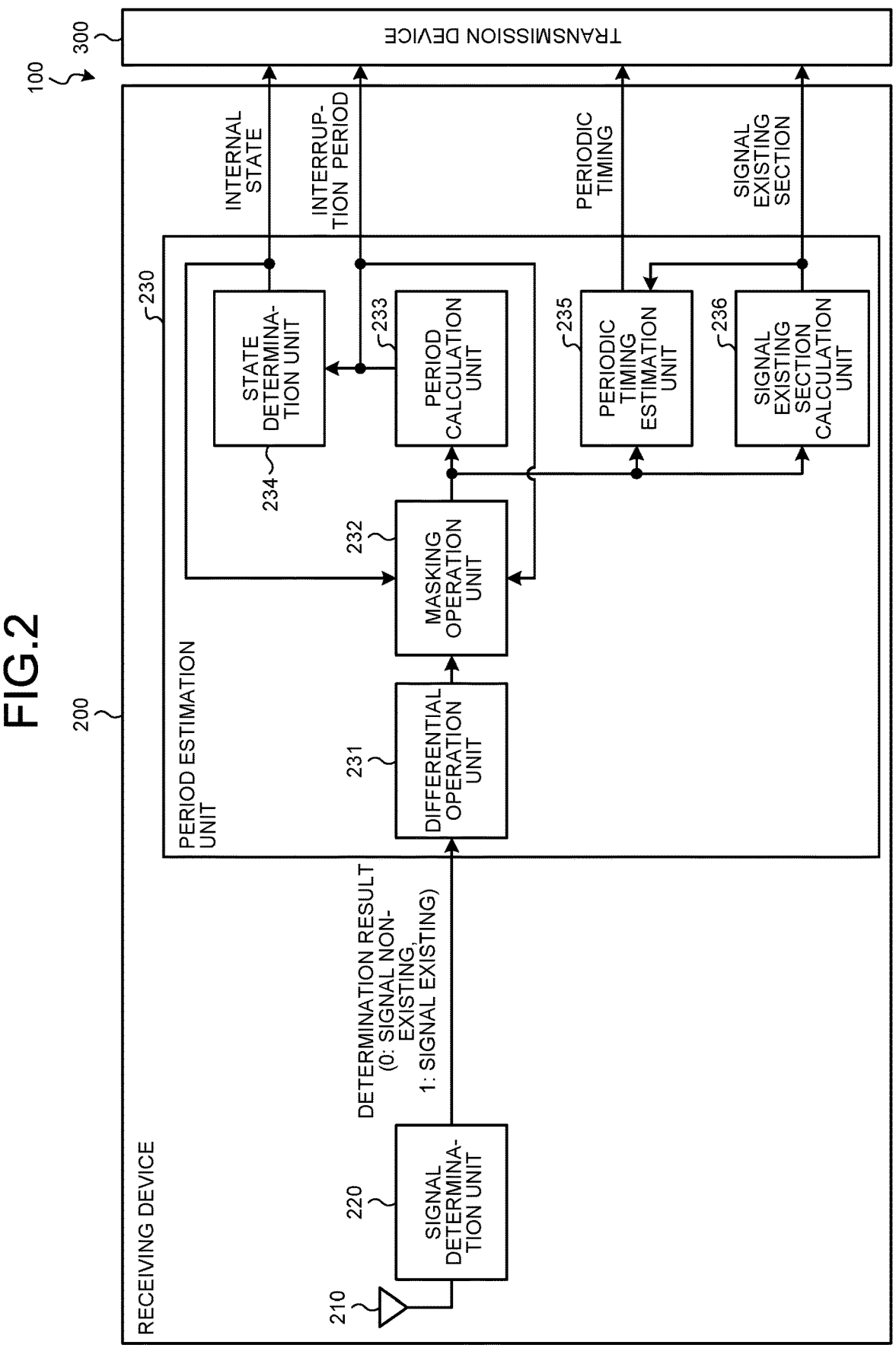
FIG. 2 is a block diagram illustrating an example configuration of the receiving device included in the communication device according to the first embodiment.
Figure 3:
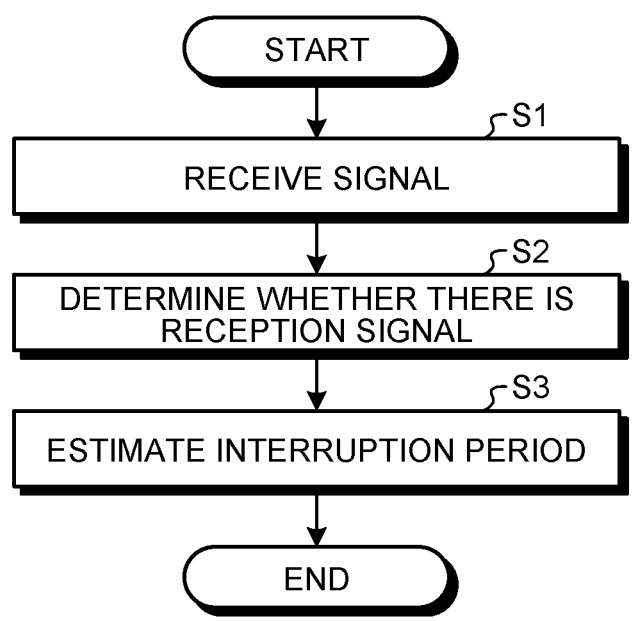
FIG. 3 is a flowchart illustrating an operation of the receiving device according to the first embodiment.

First, a configuration and an operation of the receiving device 200 included in the communication device 100 will be described. FIG. 2 is a block diagram illustrating an example configuration of the receiving device 200 included in the communication device 100 according to the first embodiment. In addition, FIG. 3 is a flowchart illustrating an operation of the receiving device 200 according to the first embodiment. The receiving device 200 includes an antenna 210, a signal determination unit 220, and a period estimation unit 230. The antenna 210 receives a signal transmitted from the communication satellite 104 and periodically interrupted by the rotary wing 102 (step S1).

The signal determination unit 220 determines whether there is a reception signal or not based on a signal reception state in the antenna 210 (step S2). Specifically, the signal determination unit 220 compares the signal level of a reception signal that is a signal received by the antenna 210 with a determination threshold predetermined to determine whether there is a signal or not, and determines whether the situation is "signal existing" or "signal non-existing" based on the comparison result. The phrase "signal existing" herein refers to a situation in which there is a reception signal, and the phrase "signal non-existing" herein refers to a situation in which there is no reception signal. There is no limitation on the method for determining whether there is a reception signal or not, but one example will now be described. The signal determination unit 220 converts the reception signal input from the antenna 210 into, for example, a reception IQ signal formed of two orthogonal signals, through digital signal processing, and calculates signal power for a certain time period (this certain time period hereinafter referred to as one block) for multiple reception IQ signals in one block. The signal determination unit 220 performs an averaging operation on the calculated signal power, using infinite impulse response (IIR) averaging, a simple average, or the like, to calculate an average signal power value. The signal determination unit 220 compares the calculated average signal power value with the determination threshold. If the average signal power value is greater than or equal to the determination threshold, the signal determination unit 220 determines that there is a reception signal, that is, the situation is "signal existing", and thus outputs a determination result of "1" indicating "signal existing" as for whether there is a reception signal or not for one block. If the average signal power value is less than the determination threshold, the signal determination unit 220 determines that there is no reception signal, that is, the situation is "signal non-existing", and thus outputs a determination result of "0" indicating "signal non-existing" as for whether there is a reception signal or not for one block.

The period estimation unit 230 estimates an interruption period, or interruption cycle period, of interruption of the signal transmitted from the source device, e.g., the communication satellite 104 in the example of FIG. 1, to the communication device 100 using the determination result from the signal determination unit 220 (step S3). Specifically, the period estimation unit 230 generates, in a set of operations to estimate the interruption period, the interruption period representing the period of interruption of the signal, periodic timing representing timing of a change from "0" to "1" in terms of the determination result from the signal determination unit 220, a signal existing section referring to a section in which the reception signal exists in one interruption period, and an internal state representing an operational state of the period estimation unit 230. Among these, the interruption period, the periodic timing, and the signal existing section are given in units of blocks, and each have an integer value. The period estimation unit 230 includes, as illustrated in FIG. 2, a differential operation unit 231, a masking operation unit 232, a period calculation unit 233, a state determination unit 234, a periodic timing estimation unit 235, and a signal existing section calculation unit 236. The differential operation unit 231 calculates a differential value with respect to the determination result from the signal determination unit 220. The masking operation unit 232 calculates a provisional period, or provisional cycle period, based on the differential value calculated by the differential operation unit 231, and masks the differential value and the provisional period based on an internal state, more specifically, based on a condition that has been set depending on the internal state. The period calculation unit 233 calculates the interruption period based on the provisional period output from the masking operation unit 232. The state determination unit 234 determines the internal state of the period estimation unit 230 using the interruption period calculated by the period calculation unit 233. The periodic timing estimation unit 235 estimates the periodic timing using the provisional period output from the masking operation unit 232 and using a signal existing section calculated by the signal existing section calculation unit 236. The signal existing section calculation unit 236 calculates the signal existing section based on the provisional period calculated by the masking operation unit 232.

Figure 4:
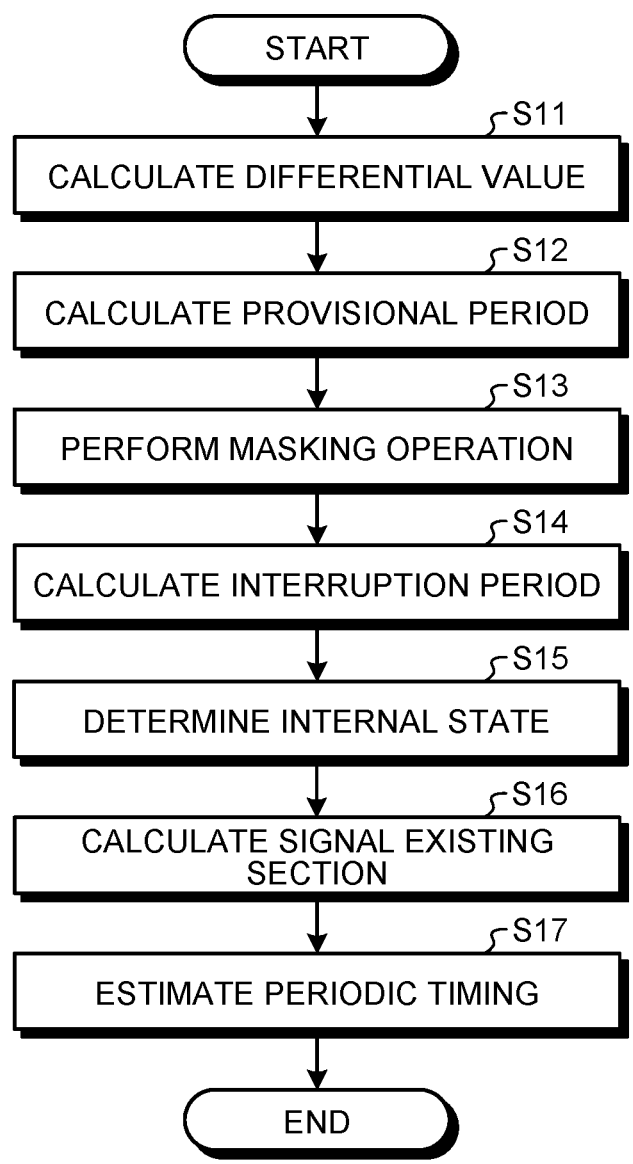
FIG. 4 is a flowchart illustrating an operation to estimate an interruption period in the period estimation unit according to the first embodiment.

A detailed operation of the period estimation unit 230 will now be described. FIG. 4 is a flowchart illustrating an operation to estimate the interruption period in the period estimation unit 230 according to the first embodiment.

The differential operation unit 231 calculates a differential value with respect to the determination result output from the signal determination unit 220, that is, detects a rising edge and a falling edge of the determination result (step S11). Specifically, when the determination result of the immediately previous block is "0" (signal non-existing) and the determination result of the current block is "1" (signal existing), the differential operation unit 231 detects a rising edge, and outputs a differential value of "1". When the determination result of the immediately previous block is "1" (signal existing) and the determination result of the current block is "0" (signal non-existing), the differential operation unit 231 detects a falling edge, and outputs a differential value of "−1". Otherwise, the differential operation unit 231 outputs a differential value of "0".

Figure 5:
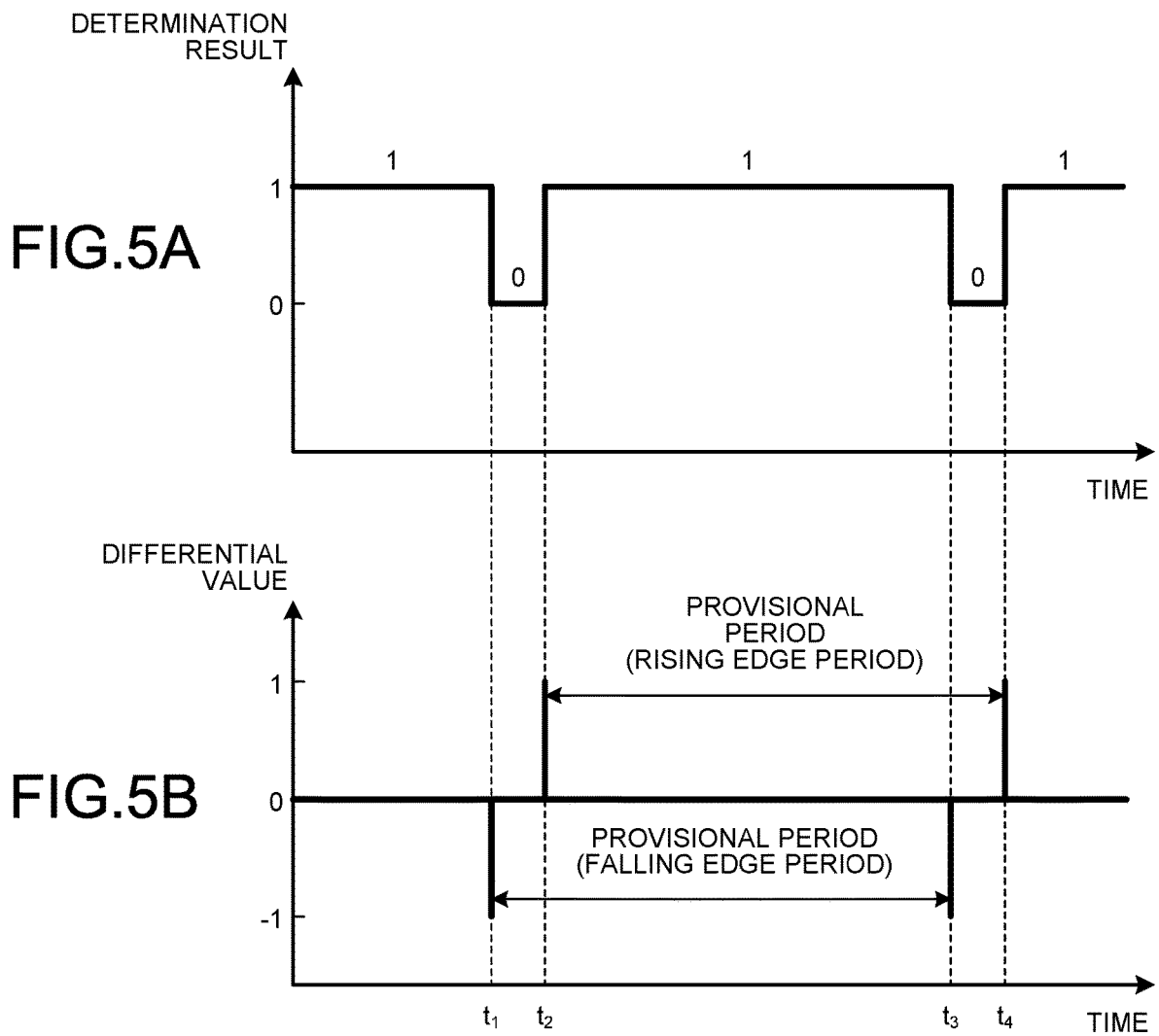
FIGS. 5A and 5B are a set of charts illustrating an example of the determination result from the signal determination unit and of the differential value calculated by the differential operation unit, of the receiving device according to the first embodiment.

The masking operation unit 232 calculates a provisional period with respect to the differential value calculated by the differential operation unit 231 (step S12). The masking operation unit 232 calculates a provisional period when the differential value is "1" or "−1", and does not calculate a provisional period when the differential value is "0". When a differential value of "1" or "−1" is input from the differential operation unit 231, the masking operation unit 232 calculates a provisional period based on the difference between the current time and the previous time when the same differential value was input. FIGS. 5A and 5B are a set of charts illustrating an example of the determination result from the signal determination unit 220 and of the differential value calculated by the differential operation unit 231, of the receiving device 200 according to the first embodiment. FIG. 5A illustrates the determination result from the signal determination unit 220; and the horizontal axis represents the time, and the vertical axis represents the value of the determination result. FIG. 5B illustrates the differential value calculated by the differential operation unit 231; and the horizontal axis represents the time, and the vertical axis represents the differential value. As illustrated in FIGS. 5A and 5B, the differential operation unit 231 calculates the differential value as "−1" at the timing of falling edge of the determination result from the signal determination unit 220, and the differential operation unit 231 calculates the differential value as "1" at the timing of rising edge of the determination result from the signal determination unit 220. For example, the differential value at time $t_3$ is "−1", and the previous time when the same differential value of "−1" was input is time $t_1$ in FIGS. 5A and 5B, and therefore, the masking operation unit 232 calculates a provisional period of "$t_3-t_1$" at time $t_3$. Similarly, the differential value at time $t_4$ is "1", and the previous time when the same differential value of "1" was input is time $t_2$ in FIGS. 5A and 5B, and therefore, the masking operation unit 232 calculates a provisional period of "$t_4-t_2$" at time $t_4$. As used herein, the provisional period calculated in association with the differential value of "−1" is referred to as falling edge period, and the provisional period calculated in association with the differential value of "1" is referred to as rising edge period.

The masking operation unit 232 controls use of the differential value and of the provisional period that has been calculated, based on the internal state. Specifically, the masking operation unit 232 performs masking operation to mask the differential value and the provisional period when a condition dependent on the internal state is met (step S13). As used herein, the term "internal state" refers to an operational state of the period estimation unit 230 determined by the state determination unit 234, and has two states: period seeking state and period-identified state. A period seeking state is a state in which the period estimation unit 230 has not yet identified the interruption period. A period-identified state is a state in which the period estimation unit 230 has identified the interruption period. The method for determining the internal state in the state determination unit 234 will be described later herein.

When the internal state is the period seeking state, the masking operation unit 232 compares the provisional period with a maximum period, which is a predetermined parameter. The masking operation unit 232 performs no operation when the provisional period is less than or equal to the maximum period, and when the provisional period exceeds the maximum period, divides the provisional period by $D_0$ (where $D_0$ is an integer greater than or equal to 2) to reduce the provisional period to less than the maximum period. In this operation, the masking operation unit 232 selects the minimum value of $D_0$ that will reduce the division result to less than or equal to the maximum period. The provisional period greater than the maximum period may be twice or more the actual value of the provisional period because of masking of the differential value. Accordingly, the masking operation unit 232 divides the provisional period greater than the maximum period by an integer to calculate a correct provisional period. Next, the masking operation unit 232 compares the provisional period with a minimum period, which is another predetermined parameter. The masking operation unit 232 masks the differential value input to the masking operation unit 232 and the provisional period that has been calculated, when the provisional period is less than the minimum period. That is, when the internal state is the period seeking state, the masking operation unit 232 does not use the differential value input to the masking operation unit 232 or the provisional period that has been calculated, when the provisional period is out of the range from the predetermined minimum period to the predetermined maximum period. The masking operation unit 232 outputs the provisional period calculated, when the provisional period is greater than or equal to the minimum period.

When the internal state is the period-identified state, the masking operation unit 232 compares the provisional period with an identified period calculated by the period calculation unit 233. The term "identified period" refers to the interruption period calculated by the period calculation unit 233 in the period-identified state. The interruption period calculated by the period calculation unit 233, i.e., the identified period, is what has been calculated in the previous operation in the period calculation unit 233. The masking operation unit 232 performs no operation when the provisional period is less than or equal to "identified period+$W_{MS}$" (where $W_{MS}$ is a tolerance in masking operation), and when the provisional period exceeds "identified period+$W_{MS}$", subtracts "identified period×$D_1$" from the provisional period to reduce the provisional period to less than or equal to "identified period+$W_{MS}$×$D_1$" (where $D_1$ is an integer greater than or equal to 2). In this operation, the masking operation unit 232 selects the minimum value of $D_1$ that will reduce the subtraction result to less than or equal to "identified period+$W_{MS}$×$D_1$". Similarly to the case in the period seeking state, when a provisional period greater than "identified period+$W_{MS}$" is input, masking of the differential value may cause the provisional period to be twice or more the actual value, and thus, the masking operation unit 232 subtracts "identified period×$D_1$" from the provisional period greater than "identified period+$W_{ms}$" to calculate a correct provisional period. Next, the masking operation unit 232 determines whether the provisional period falls within a range from a lower limit $M_{min}$ to an upper limit $M_{max}$ calculated from Formula (1) below. When the provisional period is out of the range from the lower limit $M_{min}$ to the upper limit $M_{max}$, the masking operation unit 232 masks the differential value input to the masking operation unit 232 and the provisional period calculated. That is, when the internal state is the period-identified state and the provisional period is out of a predetermined range including the identified period, the masking operation unit 232 does not use the differential value input to the masking operation unit 232 or the provisional period calculated.

$$M_{max} = \min(C_{max}, C_1 + W_{MS} \times D_1)$$

$$M_{min} = \max(C_{min}, C_1 - W_{MS} \times D_1) \qquad (1)$$

In Formula (1), $C_{max}$ represents the maximum period, $C_{min}$ represents the minimum period, and $C_1$ represents the identified period. In addition, in Formula (1), max(a, b) is a function that outputs a when a≥b, and outputs b when a<b; and min(a, b) is a function that outputs a when a≤b, and outputs b when a>b.

As described above, the masking operation unit 232 masks the differential value and the provisional period when a condition dependent on the internal state of the period estimation unit 230 is met. A detailed operation dependent on whether to perform the masking operation is as follows. When the differential value is not to be masked, the masking operation unit 232 stores the time when the differential value is "−1" or "1" to calculate the provisional period. When the differential value is to be masked, the masking operation unit 232 does not store the time when the differential value is "−1" or "1". In addition, when the provisional period is not to be masked, the masking operation unit 232 generates and outputs an enable signal together with the provisional period to specify the provisional period calculated, as a valid value. When the provisional period is to be masked, the masking operation unit 232 outputs neither the provisional period nor the enable signal. Note that, upon outputting of the provisional period, the masking operation unit 232 outputs the provisional period to allow distinction between the provisional period of a rising edge period and the provisional period of a falling edge period.

Figure 6:
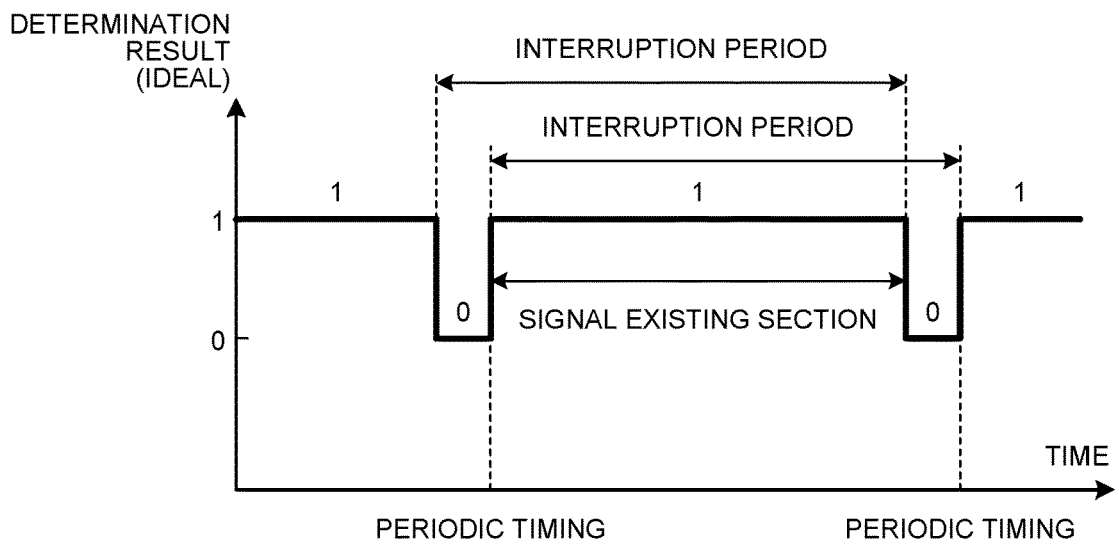
FIG. 6 is a chart illustrating an example of the determination result from the signal determination unit and of the interruption period calculated by the period calculation unit, of the receiving device according to the first embodiment.

Upon reception of the provisional period together with the enable signal, the period calculation unit 233 calculates the interruption period using the provisional period output from the masking operation unit 232 (step S14). FIG. 6 is a chart illustrating an example of the determination result from the signal determination unit 220 and of the interruption period calculated by the period calculation unit 233, of the receiving device 200 according to the first embodiment. In FIG. 6, the horizontal axis represents the time, and the vertical axis represents the value of the determination result. As illustrated in FIG. 6, assuming an ideal determination result from the signal determination unit 220, the interruption period corresponds to a section from the rising edge of the determination result to the rising edge of the next determination result or to a section from the falling edge of the determination result to the falling edge of the next determination result. When the provisional period has been input in order from a falling edge period to a rising edge period or when the provisional period has been input in order from a rising edge period to a falling edge period, from the masking operation unit 232, the period calculation unit 233 calculates the interruption period using Formula (2) below.

$$C = (C_r + C_f)/2 \qquad (2)$$

Figure 7:
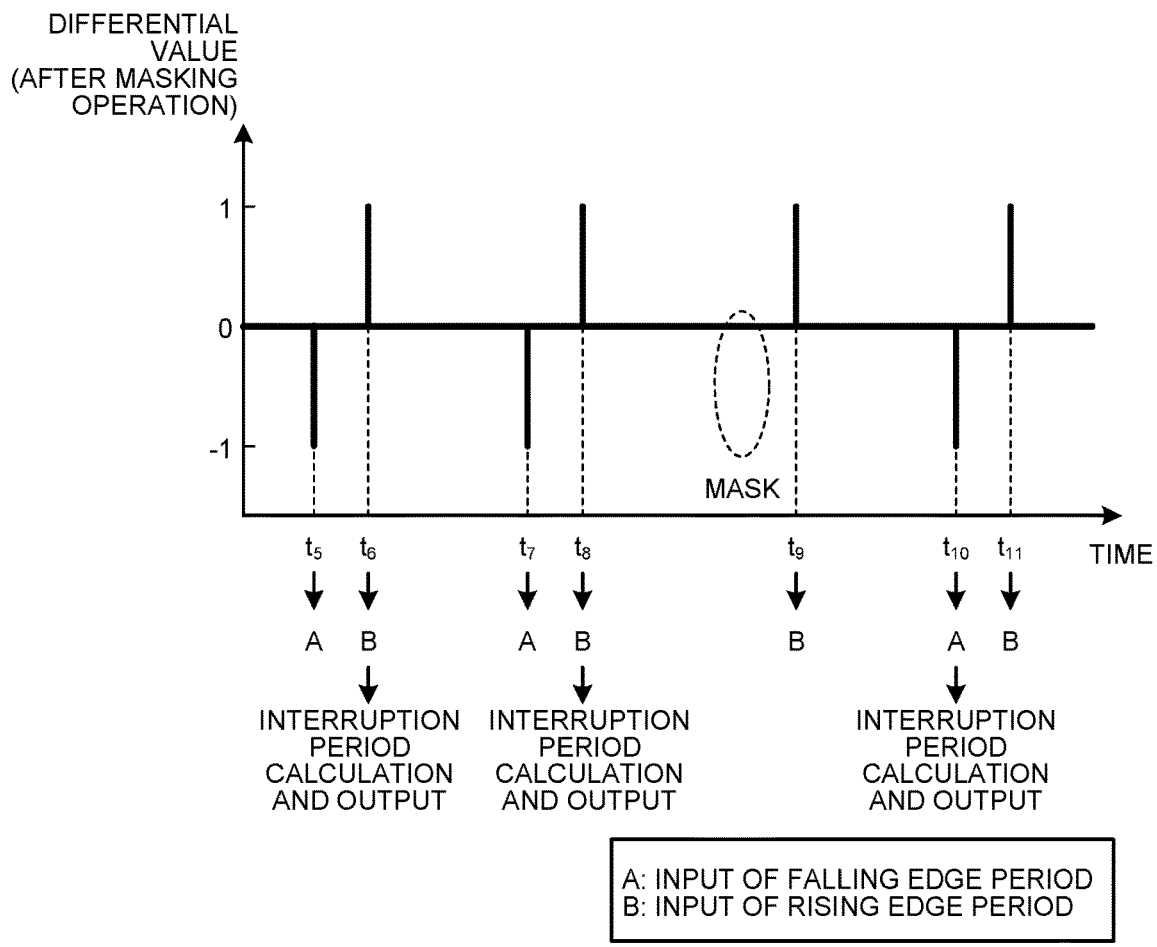
FIG. 7 is a chart illustrating an example of time points of inputting of a falling edge period or a rising edge period from the masking operation unit in the period calculation unit according to the first embodiment.

In Formula (2), C represents the interruption period, $C_r$ represents the rising edge period, and $C_f$ represents the falling edge period. Since the interruption period has an integer value as described above, the period calculation unit 233 rounds the value C to the nearest integer value in a case in which the calculation result of Formula (2) is a decimal fraction. FIG. 7 is a chart illustrating an example of time points of inputting of a falling edge period or a rising edge period from the masking operation unit 232 in the period calculation unit 233 according to the first embodiment. In FIG. 7, the horizontal axis represents the time, and the vertical axis represents the differential value after the masking operation performed by the masking operation unit 232. In a case in which, for example, a falling edge period, or a falling edge cycle period, is input at time $t_5$, and a rising edge period, or a rising edge cycle period, is input at time $t_6$ illustrated in FIG. 7, the period calculation unit 233 calculates the interruption period using Formula (2) using the falling edge period at time $t_5$ and the rising edge period at time $t_6$, and outputs the interruption period at time $t_6$. As illustrated in FIG. 7, in a case in which the indication of a falling edge, i.e., the differential value of "−1", is masked between time $t_8$ and time $t_9$, the period calculation unit 233 does not calculate the interruption period at time $t_9$ because two values of the rising edge period are input consecutively. Note that, due to input of the falling edge period at time $t_{10}$, the period calculation unit 233 calculates an interruption period using Formula (2) using the rising edge period at time $t_9$ and the falling edge period at time $t_{10}$, and outputs the interruption period at time $t_{10}$.

The state determination unit 234 determines the internal state of the period estimation unit 230 using the interruption period calculated by the period calculation unit 233 (step S15). As described above, the internal state has two states defined: period seeking state and period-identified state. It is assumed here that the period estimation unit 230 has an initial state of the period seeking state. The state determination unit 234 determines, in the period seeking state, whether the transition condition from the period seeking state to the period-identified state is met, and determines, in the period-identified state, whether the transition condition from the period-identified state to the period seeking state is met. The transition condition from the period seeking state to the period-identified state is that, for example, the interruption periods for previous $N_{BK}$ cycles fall within a range from "reference period−$W_{BK}$" to "reference period+$W_{BK}$" in the state determination unit 234, where the reference period refers to the interruption period input at the current time, i.e., the latest interruption period calculated by the period calculation unit 233. In this regard, $N_{BK}$ represents the number of backward protection zones, and is set to an integer greater than or equal to 1. In addition, $W_{BK}$ represents a tolerance of backward protection, and is set to an integer greater than or equal to 0. The reference period is given in units of blocks, and has an integer value. Moreover, the transition condition from the period-identified state to the period seeking state is that, for example, when monitoring is performed on the update time of the identified period, which is an interruption period calculated in the period-identified state, the identified period is not updated even after a time period of "identified period×$N_{FR}$" has elapsed since the previous update time in the state determination unit 234. In this regard, $N_{FR}$ represents the number of forward protection zones, and is set to an integer greater than or equal to 1.

The signal existing section calculation unit 236 calculates the signal existing section using the provisional period output from the masking operation unit 232 (step S16). The term "signal existing section" refers to a section from a rising edge to a falling edge of the determination result as illustrated in FIG. 6 for an ideal determination result from the signal determination unit 220. When the provisional period is input in order from the rising edge period to the falling edge period, the signal existing section calculation unit 236 calculates the signal existing section using Formula (3) below.

$$A = t_f - t_r \qquad (3)$$

In Formula (3), A represents the signal existing section, $t_f$ represents the time when the falling edge period was input, and $t_r$ represents the time when the rising edge period was input.

The periodic timing estimation unit 235 estimates the periodic timing using the provisional period output from the masking operation unit 232 and the signal existing section calculated by the signal existing section calculation unit 236 (step S17). The periodic timing is, for example, the timing of a rising edge of the determination result as illustrated in FIG. 6 for an ideal determination result from the signal determination unit 220. That is, the periodic timing is timing of a change from a section in which the reception signal does not exist to a section in which the reception signal exists in terms of the determination result from the signal determination unit 220. Thus, when the provisional period input from the masking operation unit 232 is a rising edge period, the periodic timing estimation unit 235 determines that the time when the rising edge period was input is the periodic timing. Otherwise, when the provisional period input from the masking operation unit 232 is a falling edge period, the periodic timing estimation unit 235 calculates the time that is one signal existing section back from the time when the falling edge period was input, and estimates that time to be the periodic timing.

Figure 8:
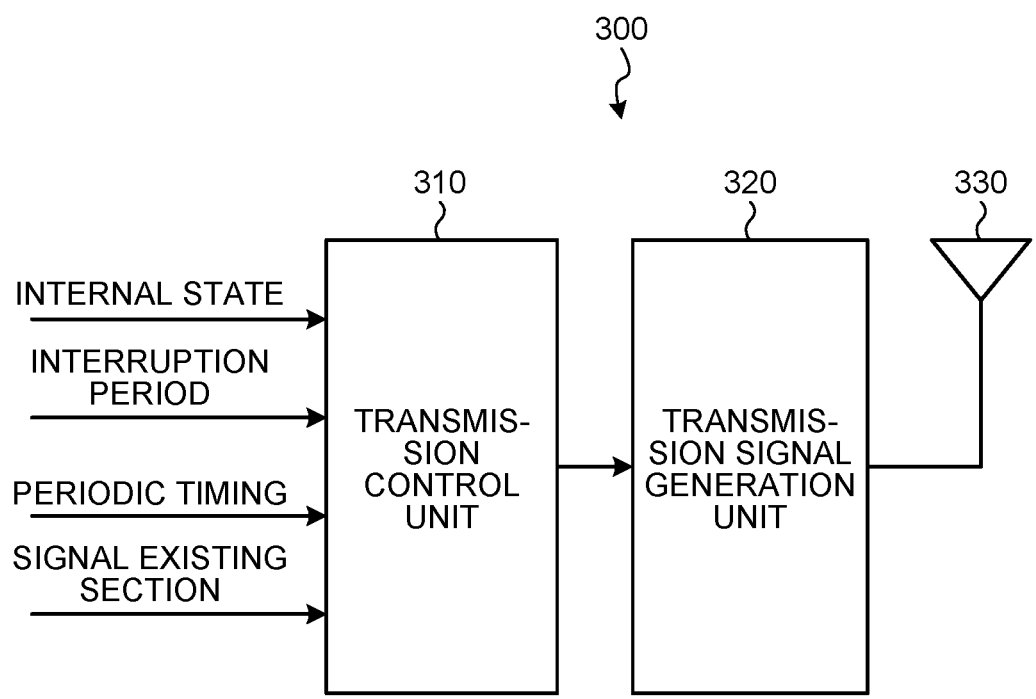
FIG. 8 is a block diagram illustrating an example configuration of the transmission device according to the first embodiment.
Figure 9:
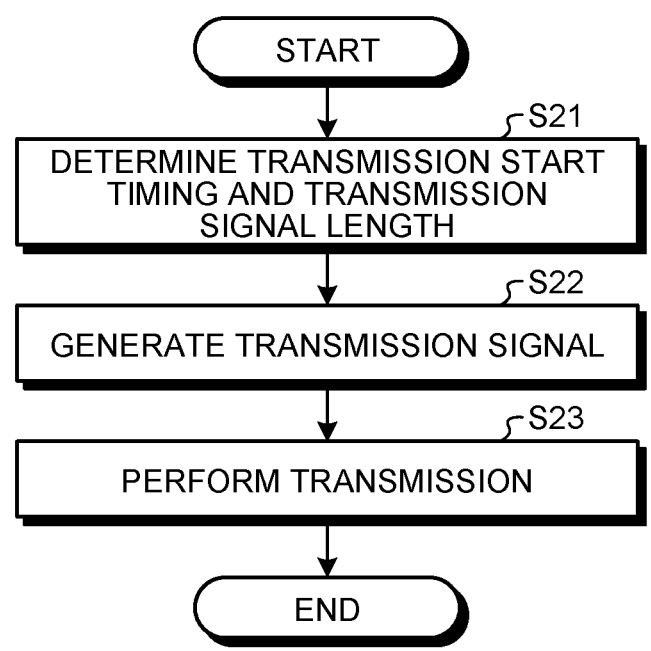
FIG. 9 is a flowchart illustrating an operation of the transmission device according to the first embodiment.

In the receiving device 200, the period estimation unit 230 outputs the internal state, the interruption period, the periodic timing, and the signal existing section to the transmission device 300. The transmission device 300 controls transmission of a transmission signal using the internal state, the interruption period, the periodic timing, and the signal existing section obtained from the receiving device 200. A configuration and an operation of the transmission device 300 will now be described. FIG. 8 is a block diagram illustrating an example configuration of the transmission device 300 according to the first embodiment. In addition, FIG. 9 is a flowchart illustrating an operation of the transmission device 300 according to the first embodiment. The transmission device 300 includes a transmission control unit 310, a transmission signal generation unit 320, and an antenna 330.

The transmission control unit 310 determines transmission start timing when a transmission signal is to be generated and transmission thereof is to be started, and the length of the transmission signal to be generated, using the internal state, the interruption period, the periodic timing, and the signal existing section that have been input from the receiving device 200 (step S21). The transmission control unit 310 determines the transmission start timing based on, for example, the periodic timing when the internal state is the period-identified state. The transmission control unit 310 predicts the periodic timing for the next or later cycle based on the interruption period when the internal state is the period-identified state, and if no update of the periodic timing occurs before the predicted next periodic timing, determines that the periodic timing predicted is the transmission start timing. In addition, the transmission control unit 310 determines the length of the transmission signal based on the signal existing section when the internal state is the period-identified state. The transmission control unit 310 generates a control signal including the transmission start timing and the length of the transmission signal that have been determined, and outputs the control signal generated, to the transmission signal generation unit 320.

The transmission signal generation unit 320 generates a transmission signal based on the transmission start timing and the length of the transmission signal included in the control signal obtained (step S22). The transmission signal generation unit 320 then transmits the transmission signal via the antenna 330 (step S23).

A hardware configuration of the receiving device 200 included in the communication device 100 will next be described. In the receiving device 200, the antenna 210 is an antenna device. The signal determination unit 220 and the period estimation unit 230 are implemented in a processing circuit. The processing circuit may be a combination of a processor that executes a program stored in a memory and the memory, or may be a dedicated hardware element.

Figure 10:
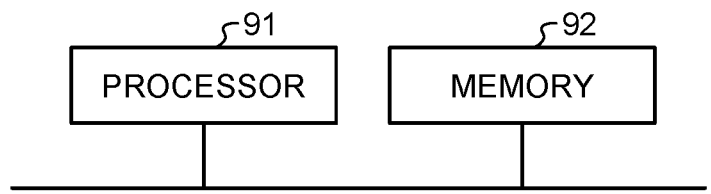
FIG. 10 is a diagram illustrating an example of a case in which a processing circuit included in the receiving device according to the first embodiment is configured using a processor and a memory.

FIG. 10 is a diagram illustrating an example of a case in which a processing circuit included in the receiving device 200 according to the first embodiment is configured using a processor and a memory. In a case in which the processing circuit is configured using a processor 91 and a memory 92, the functionality of the processing circuit of the receiving device 200 is implemented in software, firmware, or a combination of software and firmware. The software or firmware is described as a program or programs, and is stored in the memory 92. In the processing circuit, the functionality is implemented by the processor 91 by reading and executing a program stored in the memory 92. That is, the processing circuit includes the memory 92 for storing programs that cause the processing of the signal determination unit 220 and of the period estimation unit 230 to be performed. It can also be said that these programs cause a computer to execute the procedures and methods of the signal determination unit 220 and of the period estimation unit 230.

In this regard, the processor 91 may be a central processing unit (CPU), a processing unit, a computing unit, a microprocessor, a microcomputer, a digital signal processor (DSP), or the like. In addition, the memory 92 is, for example, a non-volatile or volatile semiconductor memory such as a random access memory (RAM), a read-only memory (ROM), a flash memory, an erasable programmable ROM (EPROM), or an electrically erasable programmable ROM (EEPROM) (registered trademark); a magnetic disk, a flexible disk, an optical disk, a compact disc, a MiniDisc, a digital versatile disc (DVD), or the like.

Figure 11:
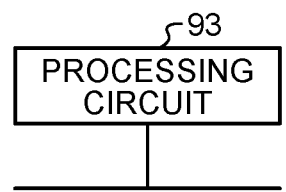
FIG. 11 is a diagram illustrating an example of a case in which the processing circuit included in the receiving device according to the first embodiment is configured using a dedicated hardware element.

FIG. 11 is a diagram illustrating an example of a case in which the processing circuit included in the receiving device 200 according to the first embodiment is configured using a dedicated hardware element. In a case in which the processing circuit is configured using a dedicated hardware element, a processing circuit 93 illustrated in FIG. 11 is, for example, a single circuit, a set of multiple circuits, a programmed processor, a set of programmed processors, an application specific integrated circuit (ASIC), a field programmable gate array (FPGA), or a combination thereof. The functionality of the signal determination unit 220 and of the period estimation unit 230 may be implemented in the processing circuit 93 on a function-by-function basis, or implemented in the processing circuit 93 collectively as a whole.

Note that the functionality of the signal determination unit 220 and of the period estimation unit 230 may be implemented partly in a dedicated hardware element, and partly in software or firmware. Thus, the processing circuit can provide the foregoing functionality by a dedicated hardware element, software, firmware, or a combination thereof.

A hardware configuration of the transmission device 300 included in the communication device 100 will next be described. In the transmission device 300, the antenna 330 is an antenna device. The transmission control unit 310 and the transmission signal generation unit 320 are implemented in a processing circuit. The processing circuit is, similarly to the processing circuit included in the receiving device 200, configured as illustrated in FIG. 10 or 11.

As described above, according to the present embodiment, the communication device 100 is configured such that the receiving device 200 performs signal determination based on the signal level of a reception signal, and obtains, from the determination result, the internal state representing an operational state, the interruption period of interruption of the signal transmitted to the communication device 100, the periodic timing representing timing of a change from a section in which the reception signal does not exist to a section in which the reception signal exists in terms of the determination result, and the signal existing section representing the section in which the reception signal exists. The transmission device 300 is configured to determine the timing of generation of a transmission signal and the length of the transmission signal using the internal state, the interruption period, the periodic timing, and the signal existing section, and to transmit the transmission signal. This enables the communication device 100 to improve accuracy of estimation of the interruption period of interruption of a communication channel by masking an internal state including the number of protection zones and unexpected interruption detection in an environment in which the communication channel is expected to be interrupted periodically. In addition, utilization of periodicity of the interruption period enables the communication device 100 to predict next transmission start timing even when detection of signal interruption has been unsuccessful, and thus to provide more efficient communication.

Second Embodiment

In a second embodiment, an averaging unit and a smoothing unit are added to the period estimation unit 230 to estimate the interruption period, the periodic timing, and the signal existing section with higher accuracy than in the first embodiment. Differences from the first embodiment will be described below.

Figure 12:
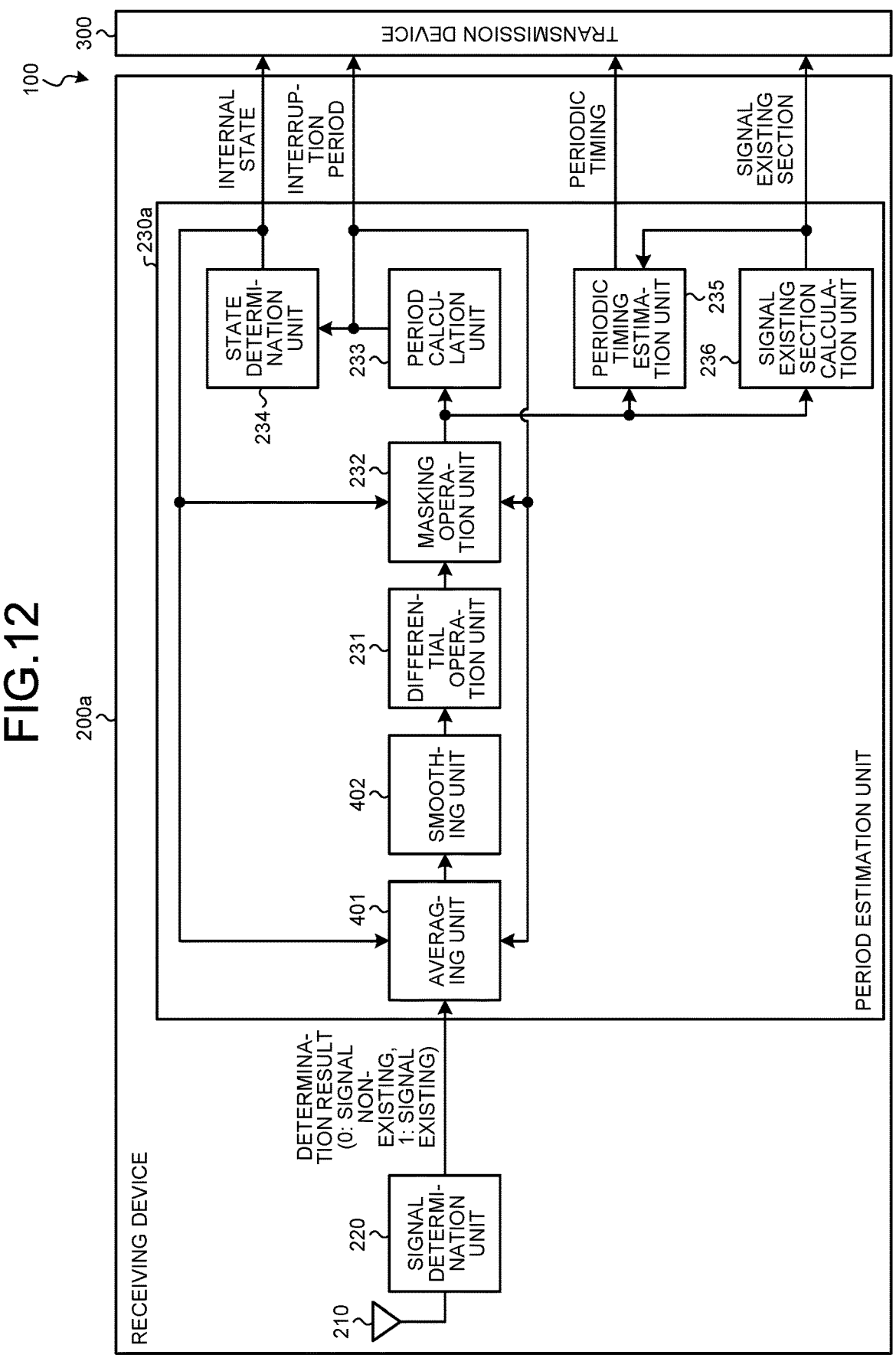
FIG. 12 is a block diagram illustrating an example configuration of a receiving device included in the communication device according to a second embodiment.
Figure 13:
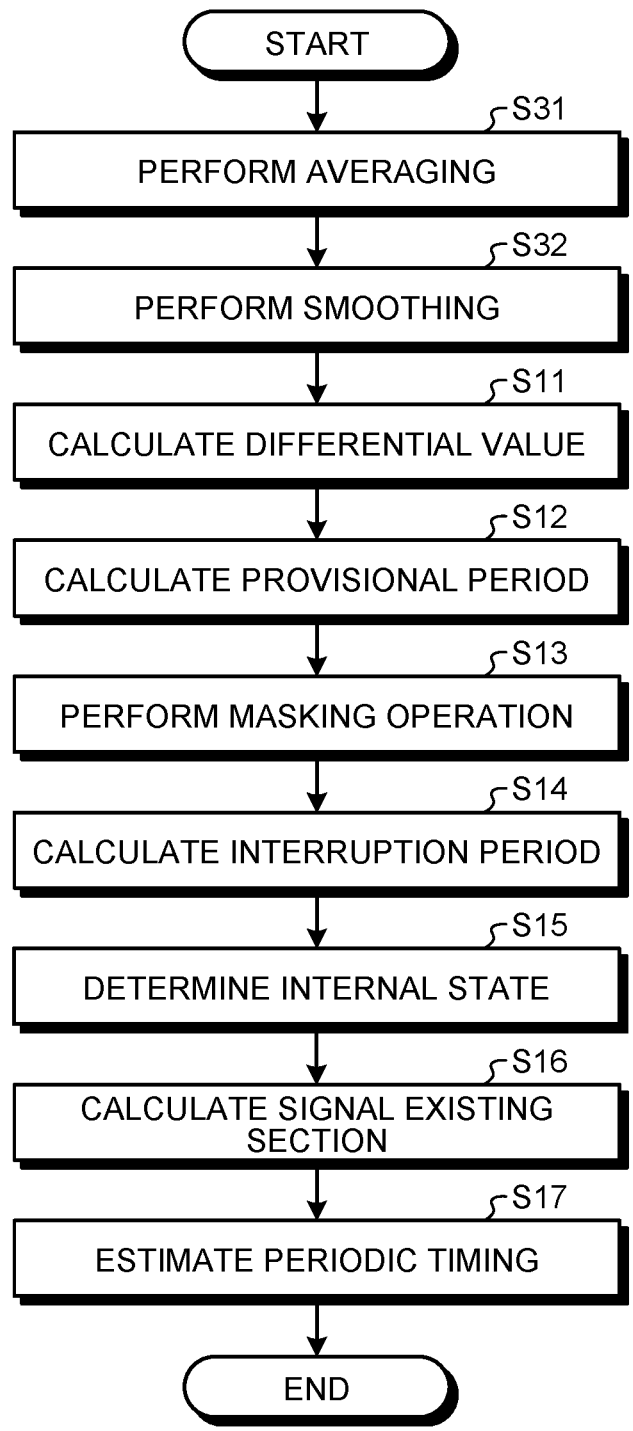
FIG. 13 is a flowchart illustrating an operation to estimate the interruption period in the period estimation unit according to the second embodiment.

FIG. 12 is a block diagram illustrating an example configuration of a receiving device 200a included in the communication device 100 according to the second embodiment. The receiving device 200a of the second embodiment illustrated in FIG. 12 includes a period estimation unit 230a in place of the period estimation unit 230 as compared to the receiving device 200 of the first embodiment illustrated in FIG. 2. The period estimation unit 230a additionally includes an averaging unit 401 and a smoothing unit 402 relative to the period estimation unit 230. The example of FIG. 12 is illustrated such that processing is performed in order from the averaging unit 401 to the smoothing unit 402, but processing may also be performed in order from the smoothing unit 402 to the averaging unit 401. The present embodiment will be described in terms of the case in which processing is performed in order from the averaging unit 401 to the smoothing unit 402 as illustrated in FIG. 12. The receiving device 200a operates similarly to the receiving device 200 of the first embodiment illustrated in the flowchart of FIG. 3, but the operation at step S3 to estimate the interruption period is different. FIG. 13 is a flowchart illustrating an operation to estimate the interruption period in the period estimation unit 230a according to the second embodiment.

The averaging unit 401 performs an averaging operation on the determination result output from the signal determination unit 220 depending on the internal state (step S31). Specifically, the averaging unit 401 does not perform the averaging operation when the internal state is the period seeking state, but performs the averaging operation when the internal state is the period-identified state. When the internal state is the period-identified state, the averaging unit 401 performs the averaging operation using the identified period using, for example, Formula (4) below in the case of averaging using a simple average.

[Formula 1]

$$s_1(t) = \Sum_{k=0}^{N_{ave}} d(t - C_1 \times k) \quad (4)$$

In Formula (4), d(t) represents the determination result input from the signal determination unit 220 to the averaging unit 401 at time t, $N_{ave}$ represents the number of cycles to be used in averaging in the simple average, $C_1$ represents the identified period, and $s_1(t)$ represents the sum at time t. The interruption period calculated by the period calculation unit 233, i.e., the identified period, is one that has been calculated in the previous operation in the period calculation unit 233. The averaging unit 401 outputs "1" when "$s_1(t) \geq N_{ave}/2$", and outputs "0" when "$s_1(t) < N_{ave}/2$" based on the sum $s_1(t)$ obtained using Formula (4). Note that, in the case of use of averaging based on IIR averaging, the averaging unit 401 performs the averaging operation using Formula (5) below.

$$s_2(t) = d(t) \times (1 - \alpha) + s_2(t - C_1) \times \alpha \quad (5)$$

In Formula (5), a represents the forgetting coefficient, and a has a value ranging from 0 to 1. The averaging unit 401 outputs "1" when "$s_2(t) \geq 0.5$", and outputs "0" when "$s_2(t) < 0.5$" based on an IIR average value $s_2(t)$ obtained using Formula (5). Thus, the averaging unit 401 averages periodically input values of the determination result using the identified period, and can thus improve accuracy of the determination result. Note that, in a case in which processing is performed in order from the smoothing unit 402 to the averaging unit 401 in the period estimation unit 230a, the averaging unit 401 performs the averaging operation on a value input from the smoothing unit 402.

The smoothing unit 402 performs a smoothing operation on the value input from the averaging unit 401 (step S32). Specifically, the smoothing unit 402 performs a smoothing operation by executing a smoothing loop L times (where L is an integer greater than or equal to 1), which is a predetermined number of times of smoothing. By way of example, in processing of an n-th smoothing loop (where n is an integer ranging from 1 to L, inclusive), the smoothing unit 402 corrects the value input at time t from "0" to "1" if the values input from the averaging unit 401 at time t-n, time t, and time t+1 are respectively "1", "0", and "1". Similarly, the smoothing unit 402 corrects the value input at time t from "1" to "0" if the values input from the averaging unit 401 at time t-n, time t, and time t+1 are respectively "0", "1", and "0". Note that time t has a discretized value of the time when a determination result is output from the signal determination unit 220, and time t is assumed to be in a range that keeps the value of t-n a positive value.

Figure 14:
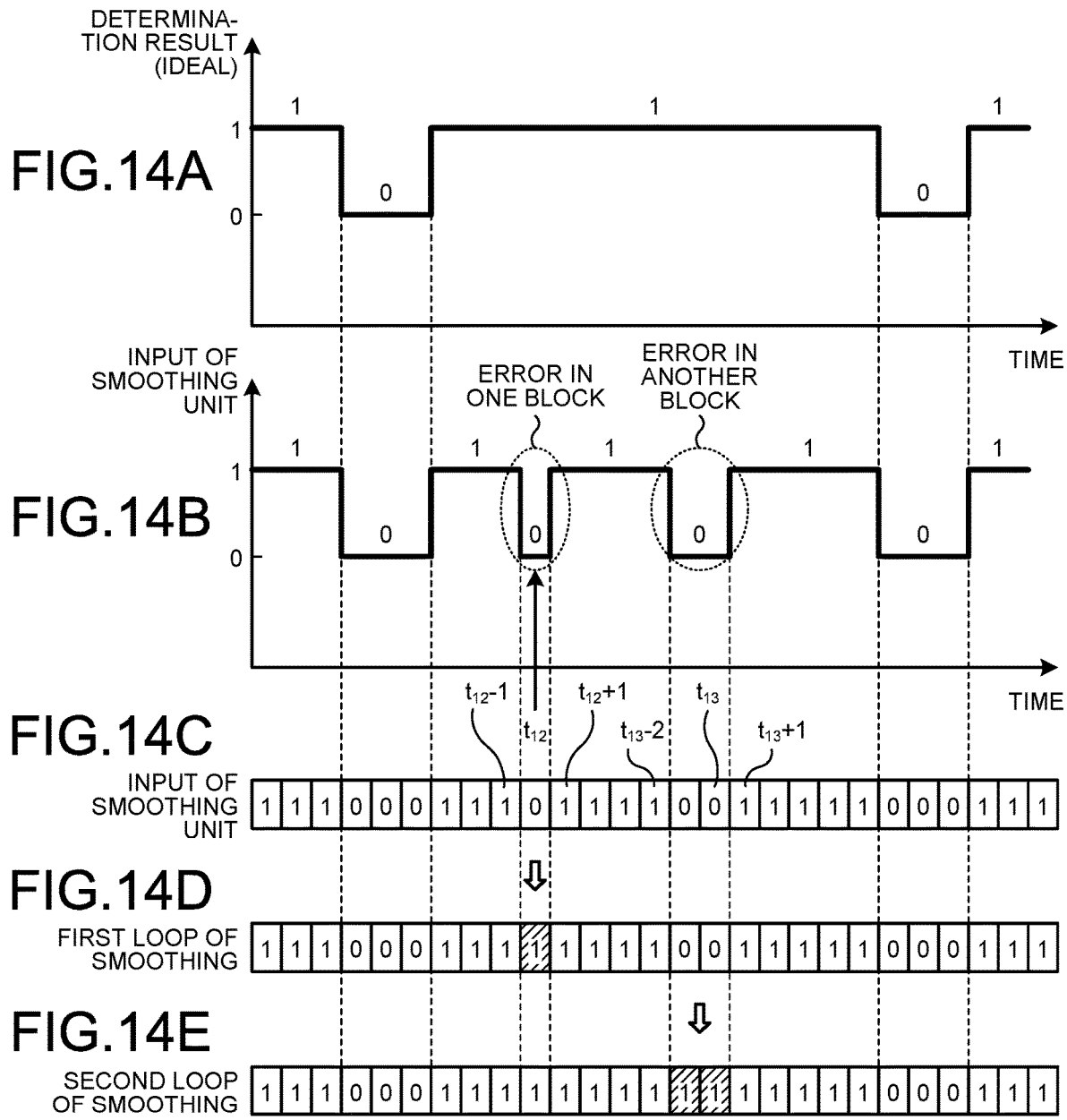
FIGS. 14A to 14E are diagrams illustrating an example of operation of smoothing in the smoothing unit according to the second embodiment.

FIGS. 14A to 14E are diagrams illustrating an example of operation of smoothing in the smoothing unit 402 according to the second embodiment. In FIGS. 14A to 14E, the graph of FIG. 14A illustrates the ideal value of the determination result from the signal determination unit 220, and the graph of FIG. 14B illustrates the value input from the averaging unit 401 to the smoothing unit 402 when the determination result includes an error. In FIGS. 14A to 14E, the horizontal axis represents the time. In addition, FIG. 14C illustrates the values illustrated in the graph of FIG. 14B on a per-block basis. The smoothing unit 402 performs the smoothing operation according to the predetermined number of times L of the smoothing loop. Referring to FIGS. 14A to 14E, an operation of smoothing for L=2 will be described by way of example. The smoothing unit 402 checks the values input at time t−1, time t, and time t+1 in the operation of the first smoothing loop. The example of FIGS. 14A to 14E is illustrated such that the values input at time $t_{12}-1$, time $t_{12}$, and time $t_{12}+1$ are "1", "0", and "1", and the smoothing unit 402 therefore corrects the value input at time $t_{12}$ from "0" to "1". This situation is illustrated in FIG. 14D. The smoothing unit 402 checks the values input at time t−2, time t, and time t+1 in the operation of the second smoothing loop. The example of FIGS. 14A to 14E is illustrated such that the values input at time $t_{13}-2$, time $t_{13}$, and time $t_{13}+1$ are "1", "0", and "1", and the smoothing unit 402 therefore corrects the value input at time $t_{13}$ from "0" to "1". This situation is illustrated in FIG. 14E. Thus, even when wrong values are consecutively input over two blocks, the smoothing unit 402 can correct the wrong values in the operation of the second smoothing loop. Note that, in a case in which processing is performed in order from the smoothing unit 402 to the averaging unit 401 in the period estimation unit 230a, the smoothing unit 402 performs the smoothing operation on the determination result output from the signal determination unit 220.

The differential operation unit 231 and the elements downstream thereof in the period estimation unit 230a operate similarly to the first embodiment as illustrated in the flowchart of FIG. 4. In addition, in the second embodiment, the receiving device 200a has a hardware configuration similar to the hardware configuration of the receiving device 200 of the first embodiment.

As described above, according to the present embodiment, the period estimation unit 230a is configured such that the averaging unit 401 performs an averaging operation on the determination result from the signal determination unit 220, and the smoothing unit 402 then performs a smoothing operation. This enables the period estimation unit 230a to improve accuracy of the determination result of the signal determination unit 220, and thus to improve, due to the improvement in the accuracy of the determination result used, accuracy of estimation of the interruption period, of the periodic timing, and of the signal existing section.

Third Embodiment

In a third embodiment, a period averaging unit, a periodic timing averaging unit, and a signal existing section averaging unit are added to the period estimation unit 230a to estimate the interruption period, the periodic timing, and the signal existing section with higher accuracy than in the second embodiment. Differences from the second embodiment will be described below.

Figure 15:
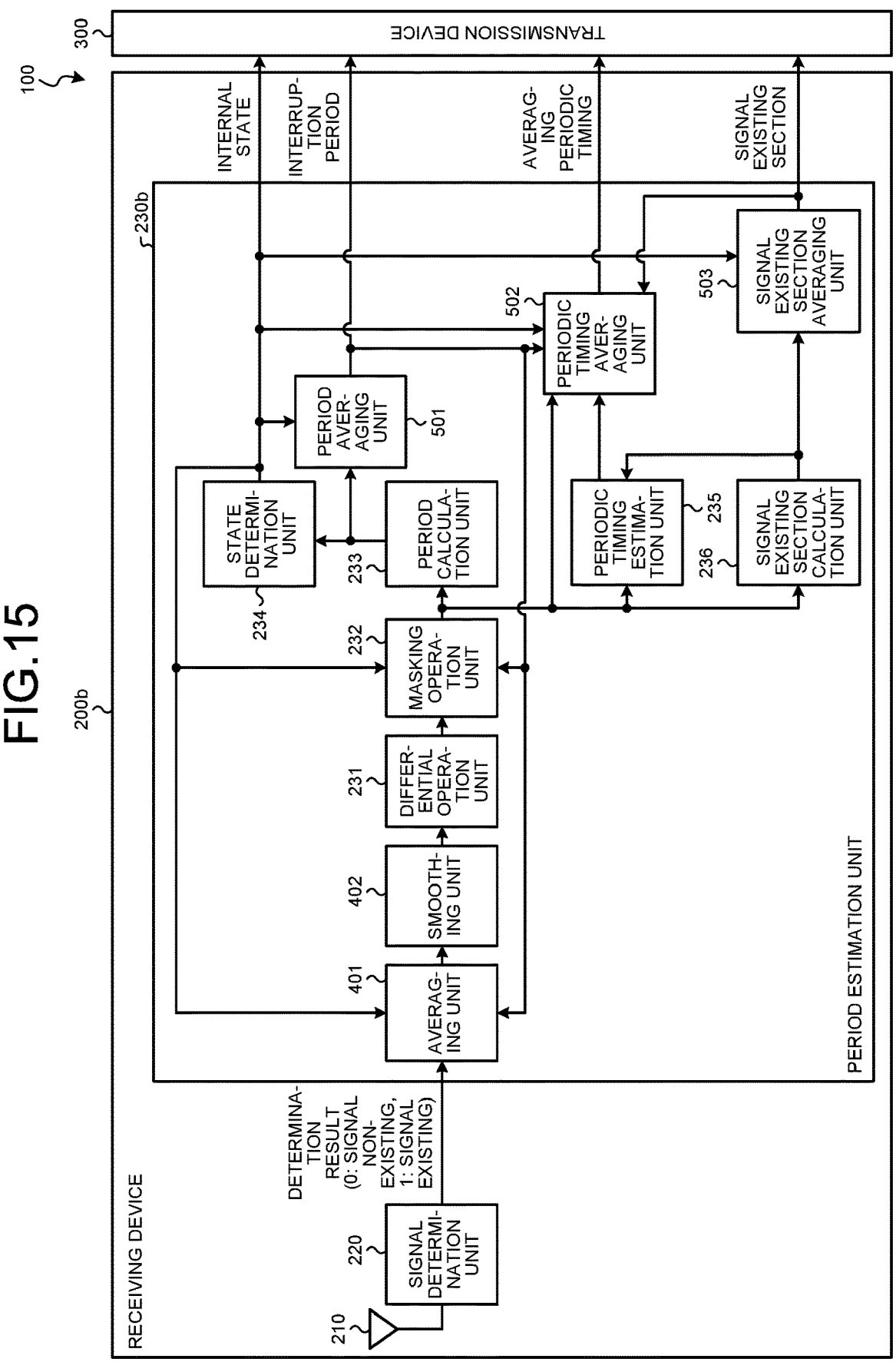
FIG. 15 is a block diagram illustrating an example configuration of a receiving device included in the communication device according to a third embodiment.
Figure 16:
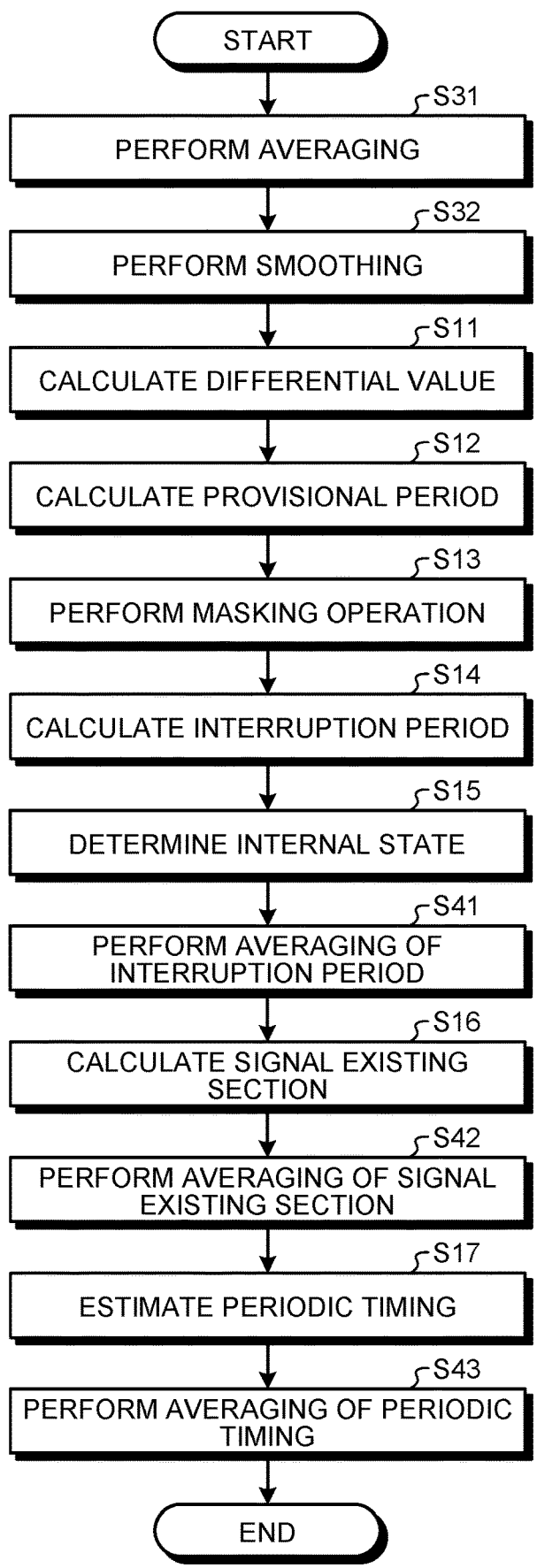
FIG. 16 is a flowchart illustrating an operation to estimate the interruption period in the period estimation unit according to the third embodiment.

FIG. 15 is a block diagram illustrating an example configuration of a receiving device 200b included in the communication device 100 according to the third embodiment. The receiving device 200b of the third embodiment illustrated in FIG. 15 includes a period estimation unit 230b in place of the period estimation unit 230a as compared to the receiving device 200a of the second embodiment illustrated in FIG. 12. The period estimation unit 230b additionally includes a period averaging unit 501, a periodic timing averaging unit 502, and a signal existing section averaging unit 503 relative to the period estimation unit 230a. The receiving device 200b operates similarly to the receiving device 200 of the first embodiment illustrated in the flowchart of FIG. 3, but the operation at step S3 to estimate the interruption period is different. FIG. 16 is a flowchart illustrating an operation to estimate the interruption period in the period estimation unit 230b according to the third embodiment. The operations of steps S31 to S17 in the flowchart illustrated in FIG. 16 are similar to the corresponding operations in the second embodiment illustrated in the flowchart of FIG. 13, except that the operations of the period averaging unit 501, of the periodic timing averaging unit 502, and of the signal existing section averaging unit 503 are added.

After the operation at step S15, the period averaging unit 501 performs an averaging operation on the interruption period calculated by the period calculation unit 233 depending on the internal state (step S41). Specifically, the period averaging unit 501 does not perform the averaging operation when the internal state is the period seeking state, and performs the averaging operation when the internal state is the period-identified state. That is, the period averaging unit 501 calculates an average interruption period, which is the average value of the identified period. The period averaging unit 501 is capable of performing the averaging operation using a simple average, IIR averaging, or the like, and there is no particular limitation on the averaging technique. In the case of averaging using a simple average, for example, the period averaging unit 501 sums up the interruption periods for previous $N_{cycle}$ cycles updated in the period calculation unit 233, and divides the sum by $N_{cycle}$ to calculate an average interruption period $C_{ave}$, where $N_{cycle}$ represents the number of cycles to be used in averaging of the interruption period. The period averaging unit 501 outputs the average interruption period to the transmission device 300. Note that the masking operation unit 232 and the averaging unit 401 use an average interruption period calculated in the previous operation in the period averaging unit 501 as the interruption period, i.e., the identified period.

After the operation at step S16, the signal existing section averaging unit 503 performs an averaging operation on the signal existing section calculated by the signal existing section calculation unit 236 depending on the internal state (step S42). Specifically, similarly to the period averaging unit 501 and to the periodic timing averaging unit 502, the signal existing section averaging unit 503 does not perform the averaging operation when the internal state is the period seeking state, and performs the averaging operation when the internal state is the period-identified state. Similarly to the period averaging unit 501 and to the periodic timing averaging unit 502, the signal existing section averaging unit 503 is capable of performing the averaging operation using a simple average, IIR averaging, or the like, and there is no limitation on the averaging technique. An operation in the case of using a simple average will now be described by way of example. In the case of averaging using a simple average, the signal existing section averaging unit 503 sums up the signal existing sections for previous $N_{avail}$ cycles updated in the signal existing section calculation unit 236, and divides the sum by $N_{avail}$ to calculate an average signal existing section $A_{ave}$, where $N_{avail}$ represents the number of cycles to be used in averaging of the signal existing section. The signal existing section averaging unit 503 outputs the average signal existing section to the transmission device 300.

After the operation at step S17, the periodic timing averaging unit 502 performs an averaging operation on the periodic timing calculated by the periodic timing estimation unit 235 depending on the internal state (step S43). Specifically, similarly to the period averaging unit 501, the periodic timing averaging unit 502 does not perform the averaging operation when the internal state is the period seeking state, and performs the averaging operation when the internal state is the period-identified state. The periodic timing averaging unit 502 is capable of performing the averaging operation using a simple average, IIR averaging, or the like, and there is no particular limitation on the averaging technique. An operation using a simple average will now be described by way of example.

The periodic timing averaging unit 502 performs an averaging operation when the provisional period is input from the masking operation unit 232. When the provisional period is input to the periodic timing averaging unit 502, the provisional period is also input to the periodic timing estimation unit 235, and the periodic timing is therein calculated. Accordingly, when the provisional period is input from the masking operation unit 232 to the periodic timing averaging unit 502, the periodic timing is input from the periodic timing estimation unit 235 to the periodic timing averaging unit 502. The periodic timing averaging unit 502 stores the input periodic timing in a memory. In addition, the periodic timing averaging unit 502 calculates the falling edge time from the input provisional period. Specifically, the periodic timing averaging unit 502 calculates the falling edge time by adding the average signal existing section calculated by the signal existing section averaging unit 503 to the time when the rising edge period was input in a case in which the provisional period is a rising edge period, and determines that the time when the falling edge period was input is the falling edge time in a case in which the provisional period is a falling edge period. The periodic timing averaging unit 502 calculates a periodic timing adjustment value $t_{adj}$ using Formula (6) below using the periodic timing stored in a memory and the falling edge time calculated.

[Formula 2]

$$t_{adj} = A_{ave} - (1/N_{tim}) \times \Sigma_{x=1}^{N_{tim}} \mathrm{mod}(t_f - t_r(x), C_{ave}) \quad (6)$$

In Formula (6), $A_{ave}$ represents the average signal existing section calculated by the signal existing section averaging unit 503, $t_f$ represents the falling edge time calculated, $t_r(x)$ represents the periodic timing input in an x-th cycle in the past, $C_{ave}$ represents the average interruption period calculated by the period averaging unit 501, $N_{tim}$ represents the number of cycles to be used in averaging of the periodic timing, and mod(a, b) represents the remainder of division of a by b. The periodic timing averaging unit 502 calculates an average periodic timing $T_{ave}$ based on the periodic timing adjustment value $t_{adj}$ calculated using Formula (6). In a case in which the provisional period input is a falling edge period, the periodic timing averaging unit 502 calculates the average periodic timing $T_{ave}$ using Formula (7) below.

$$T_{ave} = t + C_{ave} - A_{ave} + t_{adj} \quad (7)$$

In Formula (7), t is the current time, and in this case, represents the time when the falling edge period was input. In addition, in a case in which the provisional period that is input to the periodic timing averaging unit 502 is a rising edge period, the periodic timing averaging unit 502 calculates the average periodic timing $T_{ave}$ using Formula (8) below.

$$T_{ave} = t + t_{adj} \quad (8)$$

In Formula (8), t is the current time, and represents the time when the rising edge period was input. The periodic timing averaging unit 502 outputs the average periodic timing to the transmission device 300.

In the third embodiment, the period averaging unit 501 and the signal existing section averaging unit 503 are added to the period estimation unit 230a of the second embodiment. Thus, the averaging unit 401 and the masking operation unit 232 change the identified period to be used, to the average interruption period calculated by the period averaging unit 501. In addition, in the period-identified state, the periodic timing estimation unit 235 changes the signal existing section to be used, to the average signal existing section calculated by the signal existing section averaging unit 503.

The averaging unit 401 performs the averaging operation using the average interruption period $C_{ave}$ as the identified period $C_1$ in Formula (1). In addition, in the period-identified state, the masking operation unit 232 performs the masking operation using the average interruption period $C_{ave}$ as the identified period. Moreover, the periodic timing estimation unit 235 uses, as the periodic timing, a time that is one signal existing section back from the input falling edge period as in the above case when the internal state is the period seeking state, and uses, as the periodic timing, a time that is one average signal existing section back from the input falling edge period when the internal state is the period-identified state.

Note that the period estimation unit 230b has been described as performing the operation of step S41 after the operation of step S15, the operation of step S42 after the operation of step S16, and the operation of step S43 after the operation of step S17, but the order of the operations is not limited thereto. For example, the period estimation unit 230b may perform the operations of steps S41, S42, and S43 after step S17.

In the third embodiment, the receiving device 200b has a hardware configuration similar to the hardware configuration of the receiving device 200 of the first embodiment.

As described above, according to the present embodiment, the period estimation unit 230b further includes the period averaging unit 501, the periodic timing averaging unit 502, and the signal existing section averaging unit 503 to average the interruption period, the periodic timing, and the signal existing section. This enables the period estimation unit 230b to improve accuracy of estimation of the interruption period, the periodic timing, and the signal existing section.

Fourth Embodiment

In a fourth embodiment, the receiving device determines non-periodicity of interruption, and the transmission device provides transmission control dependent on the non-periodicity of interruption. Thus, a situation of no signal interruption is detected to provide efficient communication, and a situation of complete interruption of a signal is detected to prevent useless transmission. This is applicable to any one of the first through third embodiments, but, by way of example, a case of application to the first embodiment will be described below focusing on differences from the first embodiment.

Figure 17:
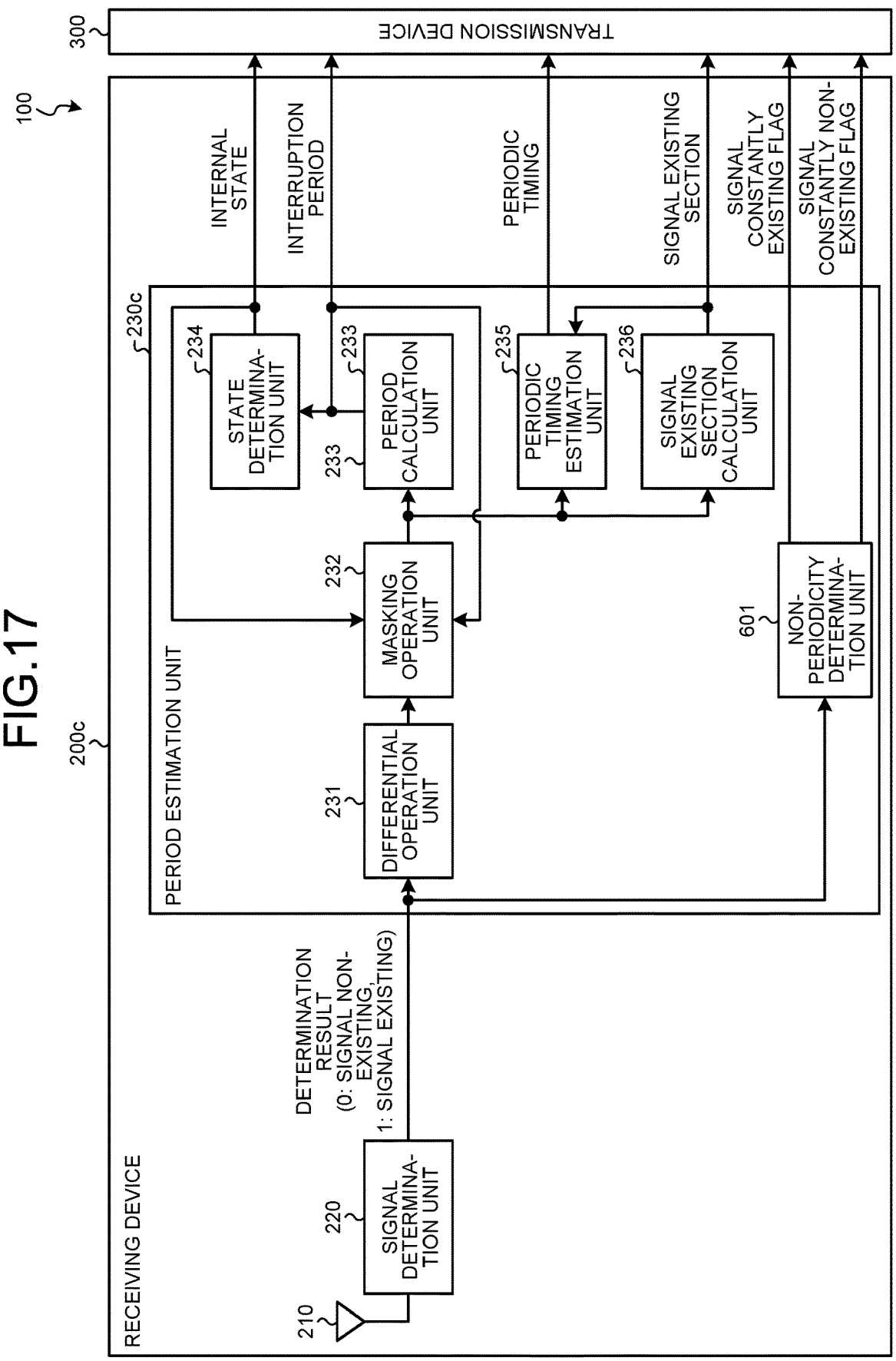
FIG. 17 is a block diagram illustrating an example configuration of a receiving device included in the communication device according to a fourth embodiment.
Figure 18:
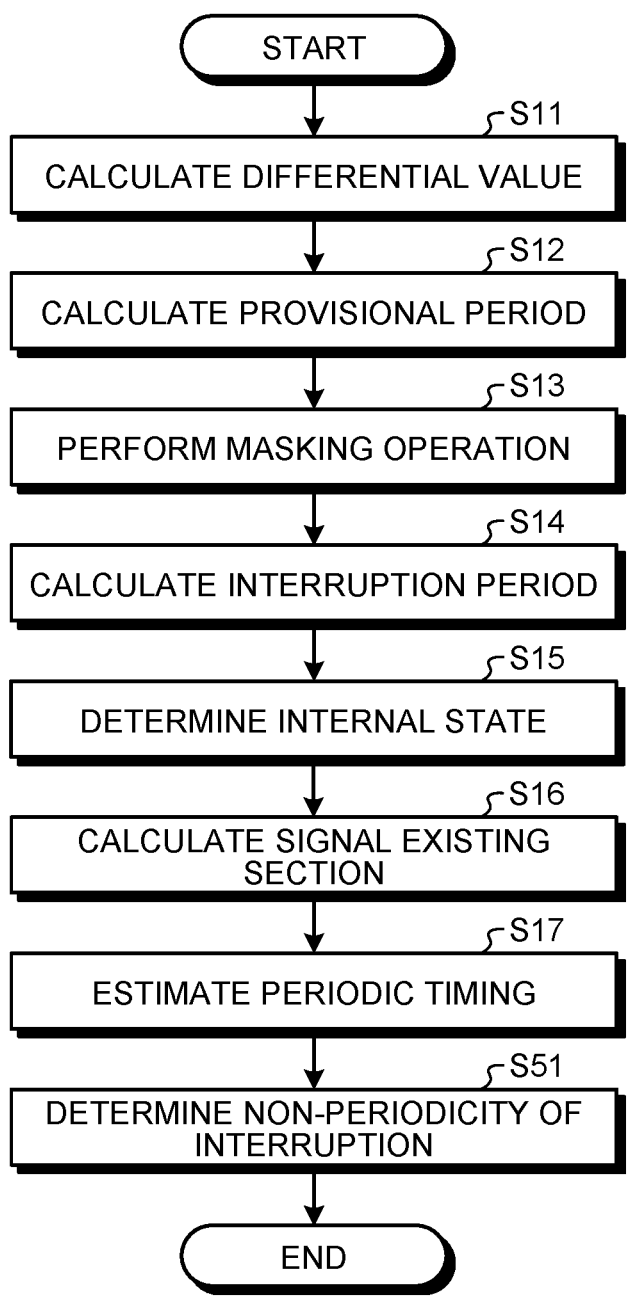
FIG. 18 is a flowchart illustrating an operation to estimate the interruption period in the period estimation unit according to the fourth embodiment.

FIG. 17 is a block diagram illustrating an example configuration of a receiving device 200c included in the communication device 100 according to the fourth embodiment. The receiving device 200c of the fourth embodiment illustrated in FIG. 17 includes a period estimation unit 230c in place of the period estimation unit 230 as compared to the receiving device 200 of the first embodiment illustrated in FIG. 2. The period estimation unit 230c additionally includes a non-periodicity determination unit 601 relative to the period estimation unit 230. The receiving device 200c operates similarly to the receiving device 200 of the first embodiment illustrated in the flowchart of FIG. 3, but the operation at step S3 to estimate the interruption period is different. FIG. 18 is a flowchart illustrating an operation to estimate the interruption period in the period estimation unit 230c according to the fourth embodiment. The operations of steps S11 to S17 in the flowchart illustrated in FIG. 18 are similar to the corresponding operations in the first embodiment illustrated in the flowchart of FIG. 4.

Figure 19:
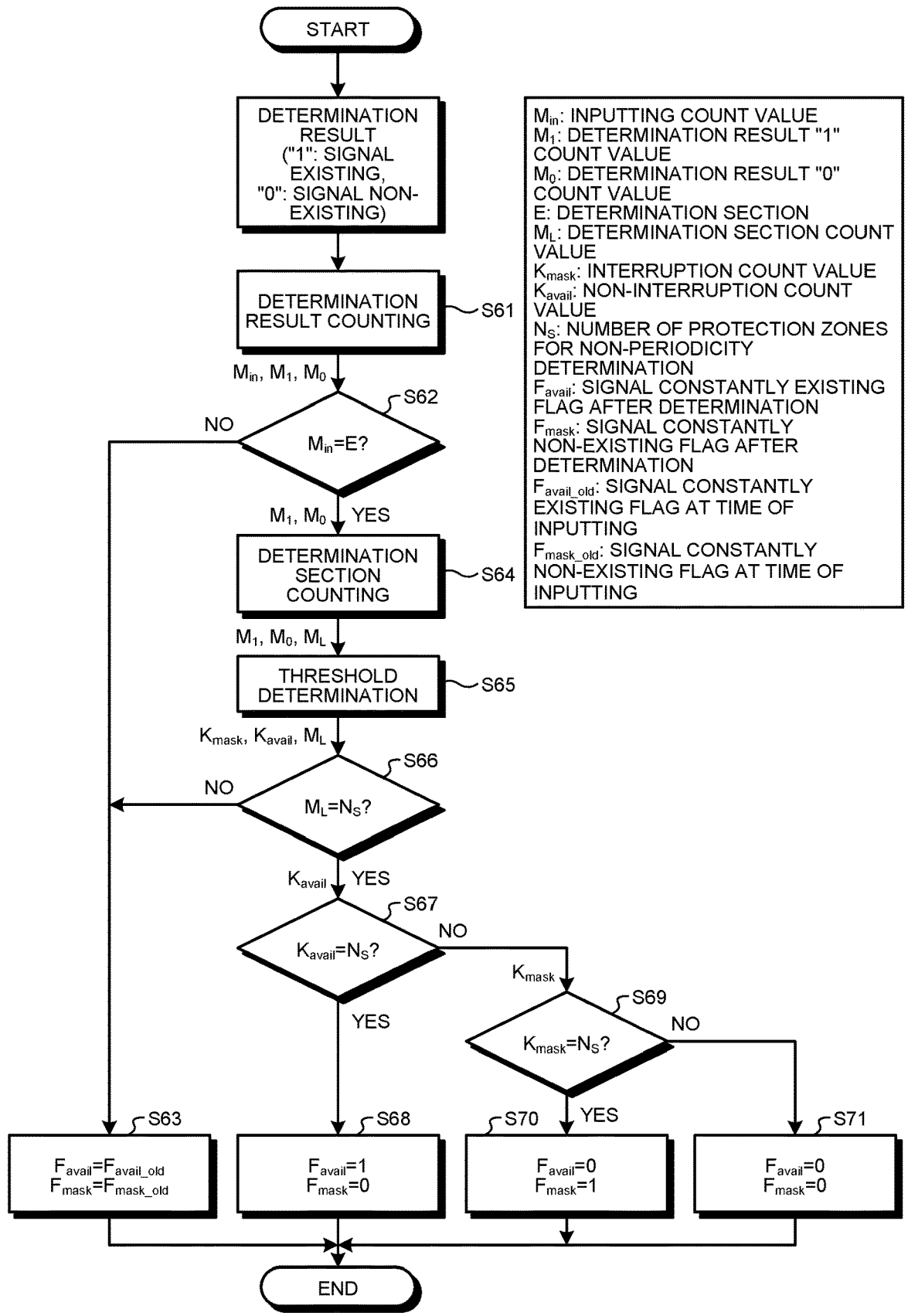
FIG. 19 is a flowchart illustrating an operation to determine non-periodicity of interruption in the non-periodicity determination unit according to the fourth embodiment.

The non-periodicity determination unit 601 determines non-periodicity of interruption, that is, determines whether the situation is "signal constantly existing" or "signal constantly non-existing" based on the determination result input from the signal determination unit 220 (step S51). The phrase "signal constantly existing" refers to a situation in which the signal is being continuously received, and the phrase "signal constantly non-existing" refers to a situation in which the signal is being continuously unreceived. Specifically, the non-periodicity determination unit 601 generates a signal constantly existing flag that indicates whether the signal is being continuously received, and a signal constantly non-existing flag that indicates whether the signal is being continuously unreceived, based on the determination result input from the signal determination unit 220. An operation of the non-periodicity determination unit 601 will now be described in detail. FIG. 19 is a flowchart illustrating an operation to determine non-periodicity of interruption in the non-periodicity determination unit 601 according to the fourth embodiment.

The non-periodicity determination unit 601 counts the determination result input from the signal determination unit 220 (step S61). The non-periodicity determination unit 601 counts the number of inputs of the determination result that is input, and sets an inputting count value as $M_{in}$. The non-periodicity determination unit 601 also counts the number of inputs of the determination result that is input and has a value of "1", and sets a determination result "1" count value as M. The non-periodicity determination unit 601 further counts the number of inputs of the determination result that is input and has a value of "0", and sets a determination result "0" count value as $M_0$.

The non-periodicity determination unit 601 determines whether the inputting count value $M_{in}$ matches a determination section E (step S62). Specifically, the non-periodicity determination unit 601 determines whether the number of inputs has reached the determination section E, where the determination section E represents the number of inputs of the determination result for counting the number of the determination results each having a value of "1" and "0". If a relationship of [inputting count value $M_{in}$]<[determination section E] holds (step S62: No), the non-periodicity determination unit 601 does not change a signal constantly existing flag $F_{avail}$ and a signal constantly non-existing flag $F_{mask}$ from the values at the time of inputting of the determination result, and outputs, without change, a signal constantly existing flag $F_{avail\_old}$ and a signal constantly non-existing flag $F_{mask\_old}$ at the time of inputting of the same value as at a previous time (step S63). If a relationship of [inputting count value $M_{in}$]=[determination section E] holds (step S62: Yes), the non-periodicity determination unit 601 counts the number of times of reaching the determination section, and counts up a determination section count value $M_L$ (step S64).

The non-periodicity determination unit 601 makes a threshold determination on the determination result "1" count value $M_1$ and on the determination result "0" count value $M_0$ (step S65). The non-periodicity determination unit 601 counts up an interruption count value $K_{mask}$ if a relation of [determination result "1" count value $M_1$]≤[threshold $H_1$] holds, and counts up a non-interruption count value $K_{avail}$ if a relation of [determination result "0" count value $M_0$]≤ [threshold $H_0$] holds. In this regard, the threshold $H_1$ is a threshold of the determination result "1" count value $M_1$, and the threshold $H_0$ is a threshold of the determination result "0" count value $M_0$.

The non-periodicity determination unit 601 determines whether the determination section count value $M_L$ matches the number of protection zones $N_S$ for non-periodicity determination (step S66). Specifically, the non-periodicity determination unit 601 determines whether the determination section count value $M_L$ counted using the number of inputs has reached the number of protection zones $N_S$ for non-periodicity determination. In this regard, the number of protection zones $N_S$ for non-periodicity determination represents the number of the determination sections required for non-periodicity determination. If a relationship of [determination section count value $M_L$]<[number of protection zones $N_S$ for non-periodicity determination] holds (step S66: No), the non-periodicity determination unit 601 does not change the signal constantly existing flag $F_{avail}$ and the signal constantly non-existing flag $F_{mask}$ from the values at the time of inputting of the determination result, and outputs, without change, the signal constantly existing flag $F_{avail\_old}$ and the signal constantly non-existing flag $F_{mask\_old}$ at the time of inputting of the same value as at a previous time (step S63). If a relationship of [determination section count value $M_L$]= [number of protection zones $N_S$ for non-periodicity determination] holds (step S66: Yes), the non-periodicity determination unit 601 determines whether the non-interruption count value $K_{avail}$ matches the number of protection zones $N_S$ for non-periodicity determination (step S67).

If a relationship of [non-interruption count value $K_{avail}$] =[number of protection zones $N_S$ for non-periodicity determination] holds (step S67: Yes), the non-periodicity determination unit 601 outputs the signal constantly existing flag $F_{avail}$ after the determination having a value of "1" and the signal constantly non-existing flag $F_{mask}$ after the determination having a value of "0" (step S68). Note that the signal constantly existing flag $F_{avail}$ after the determination may also be hereinafter referred to simply as signal constantly existing flag $F_{avail}$, and the signal constantly non-existing flag $F_{mask}$ after the determination may also be hereinafter referred to simply as signal constantly non-existing flag $F_{mask}$. The signal constantly existing flag $F_{avail}$ having a value of "1" is a signal constantly existing flag indicating that the signal is being continuously received, while the signal constantly non-existing flag $F_{mask}$ having a value of "0" is a signal constantly non-existing flag indicating that it is not in a situation in which the signal is being continuously unreceived. The phrase "it is not in a situation in which the signal is being continuously unreceived" refers to either a situation in which the signal is being continuously received or a situation in which the signal is interrupted and being periodically received. If a relationship of [non-interruption count value $K_{avail}$]<[number of protection zones $N_S$ for non-periodicity determination] holds (step S67: No), the non-periodicity determination unit 601 determines whether the interruption count value $K_{mask}$ matches the number of protection zones $N_S$ for non-periodicity determination (step S69). If a relationship of [interruption count value $K_{mask}$]= [number of protection zones $N_S$ for non-periodicity determination] holds (step S69: Yes), the non-periodicity determination unit 601 outputs the signal constantly existing flag $F_{avail}$ having a value of "0" and the signal constantly non-existing flag $F_{mask}$ having a value of "1" (step S70). The signal constantly existing flag $F_{avail}$ having a value of "0" is a signal constantly existing flag indicating that it is not in a situation in which the signal is being continuously received. In addition, the signal constantly non-existing flag $F_{mask}$ having a value of "1" is a signal constantly non-existing flag indicating that the signal is being continuously unreceived. The phrase "it is not in a situation in which the signal is being continuously received" refers to either a situation in which the signal is being continuously unreceived or a situation in which the signal is interrupted and being periodically received. If a relationship of [interruption count value $K_{mask}$]<[number of protection zones $N_S$ for non-periodicity determination] holds (step S69: No), the non-periodicity determination unit 601 outputs the signal constantly existing flag $F_{avail}$ having a value of "0" and the signal constantly non-existing flag $F_{mask}$ having a value of "0" (step S71). The non-periodicity determination unit 601 is capable of generating and outputting the signal constantly existing flag $F_{avail}$ and the signal constantly non-existing flag $F_{mask}$ in the operation of the flowchart illustrated in FIG. 19.

Note that the foregoing description assumes that, in the period estimation unit 230c, the operation of the non-periodicity determination unit 601 is performed after the operations of the elements from the differential operation unit 231 to the signal existing section calculation unit 236. However, there is no limitation on when to perform the operation of the non-periodicity determination unit 601. In the period estimation unit 230c, the operation of the non-periodicity determination unit 601 may be performed prior to the operations of the elements from the differential operation unit 231 to the signal existing section calculation unit 236, or the operation of the non-periodicity determination unit 601 may be performed in parallel with the operations of the elements from the differential operation unit 231 to the signal existing section calculation unit 236.

In the fourth embodiment, the receiving device 200c has a hardware configuration similar to the hardware configuration of the receiving device 200 of the first embodiment.

An operation of the transmission device 300 that has received the signal constantly existing flag $F_{avail}$ and the signal constantly non-existing flag $F_{mask}$ will next be described. The transmission device 300 of the fourth embodiment is configured similarly to the transmission device 300 of the first embodiment illustrated in FIG. 8. However, the transmission device 300 is configured such that the transmission control unit 310 further receives the signal constantly existing flag $F_{avail}$ and the signal constantly non-existing flag $F_{mask}$ from the receiving device 200c.

Figure 20:
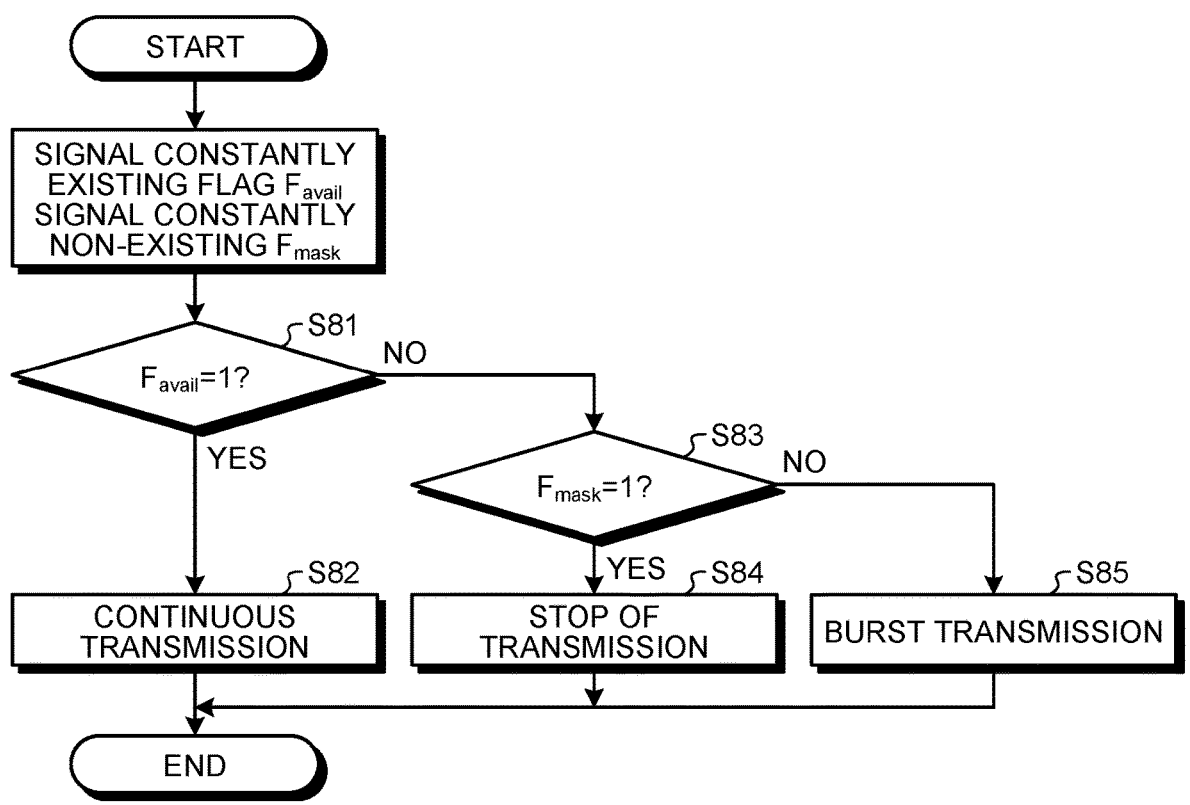
FIG. 20 is a flowchart illustrating a transmission control operation in a transmission control unit of the transmission device according to the fourth embodiment.

FIG. 20 is a flowchart illustrating a transmission control operation in a transmission control unit 310 of the transmission device 300 according to the fourth embodiment. In a case of reception of the signal constantly existing flag $F_{avail}$ having a value of "1" (step S81: Yes), the transmission control unit 310 determines that no signal interruption is occurring, and thus determines to continuously transmit a signal from the communication device 100 (step S82). The transmission control unit 310 generates a control signal that indicates continuous transmission, and outputs the control signal to the transmission signal generation unit 320. In a case of reception of the signal constantly existing flag $F_{avail}$ having a value of "0" (step S81: No) and of reception of the signal constantly non-existing flag $F_{mask}$ having a value of "1" (step S83: Yes), the transmission control unit 310 determines that the signal is completely interrupted, and determines to stop transmission of the signal from the communication device 100 (step S84). The transmission control unit 310 generates a control signal that indicates stop of transmission, and outputs the control signal to the transmission signal generation unit 320. In a case of reception of the signal constantly existing flag $F_{avail}$ having a value of "0" (step S81: No) and of reception of the signal constantly non-existing flag $F_{mask}$ having a value of "0" (step S83: No), the transmission control unit 310 determines that the signal is periodically interrupted, and determines to transmit a burst signal (step S85). In this case, the transmission control unit 310 performs the operation of step S21 illustrated in the flowchart of FIG. 9 described in the first embodiment to determine the transmission start timing and the length of the transmission signal. Specifically, the transmission control unit 310 provides control to transmit a burst signal that is a transmission signal having a burst signal length less than the length of the signal existing section. The transmission control unit 310 generates a control signal including the transmission start timing and the length of the transmission signal that have been determined, and outputs the control signal to the transmission signal generation unit 320.

As described above, according to the present embodiment, the period estimation unit 230c is configured such that the non-periodicity determination unit 601 determines periodicity of signal interruption, and generates the signal constantly existing flag and the signal constantly non-existing flag, and the transmission control unit 310 provides transmission control using the signal constantly existing flag and the signal constantly non-existing flag. Specifically, the transmission control unit 310 performs continuous transmission when no signal interruption is occurring, stops transmission when the signal is completely interrupted, and when the signal is periodically interrupted, determines the transmission start timing and the length of the transmission signal for transmitting a burst signal, using the interruption period, the periodic timing, and the signal existing section, and then transmits a burst signal. This enables the transmission control unit 310 to provide more efficient signal transmission than when non-periodicity of signal interruption is unused.

Fifth Embodiment

In a fifth embodiment, the receiving device applies a weight to the reception signal to improve demodulation performance. This is applicable to any one of the first through fourth embodiments, but, by way of example, a case of application to the first embodiment will be described below focusing on differences from the first embodiment.

Figure 21:
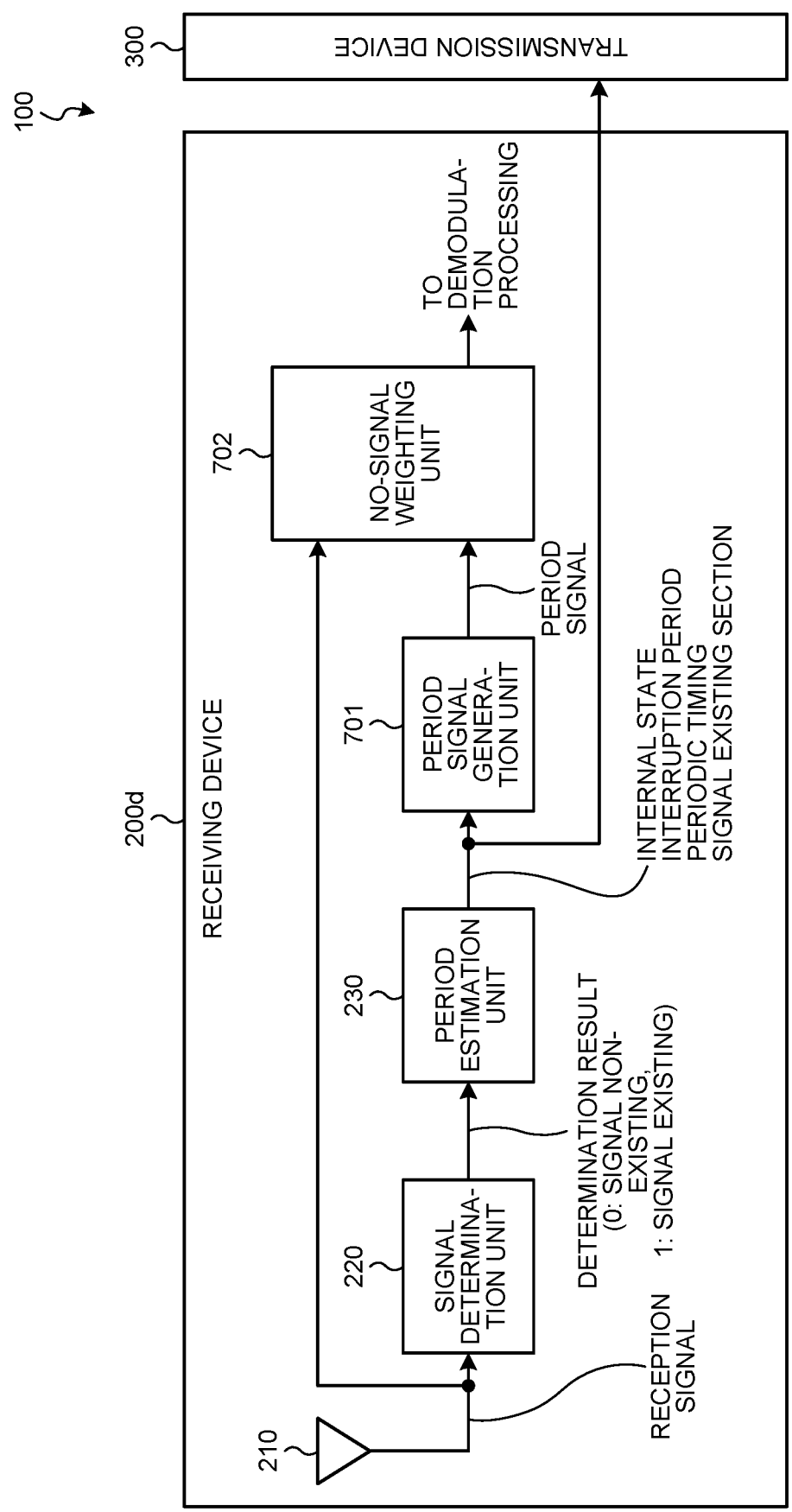
FIG. 21 is a block diagram illustrating an example configuration of a receiving device included in the communication device according to a fifth embodiment
Figure 22:
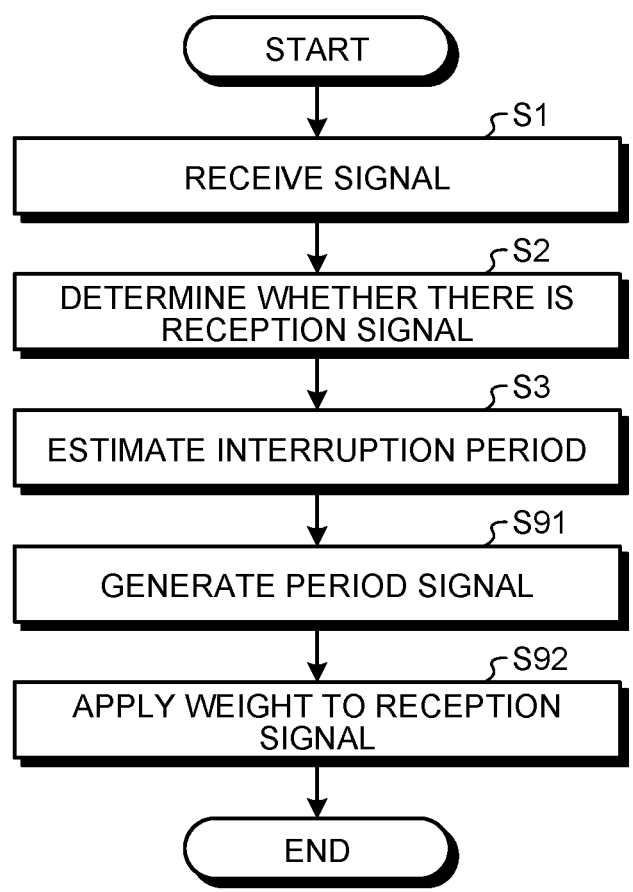
FIG. 22 is a flowchart illustrating an operation of the receiving device according to the fifth embodiment.

FIG. 21 is a block diagram illustrating an example configuration of a receiving device 200d included in the communication device 100 according to the fifth embodiment. The receiving device 200d of the fifth embodiment illustrated in FIG. 21 additionally includes a period signal generation unit 701 and a no-signal weighting unit 702 relative to the receiving device 200 of the first embodiment illustrated in FIG. 2. FIG. 22 is a flowchart illustrating an operation of the receiving device 200d according to the fifth embodiment. The operations of steps S1 to S3 in the flowchart illustrated in FIG. 22 are similar to the corresponding operations in the first embodiment illustrated in the flowchart of FIG. 3.

Figure 23:
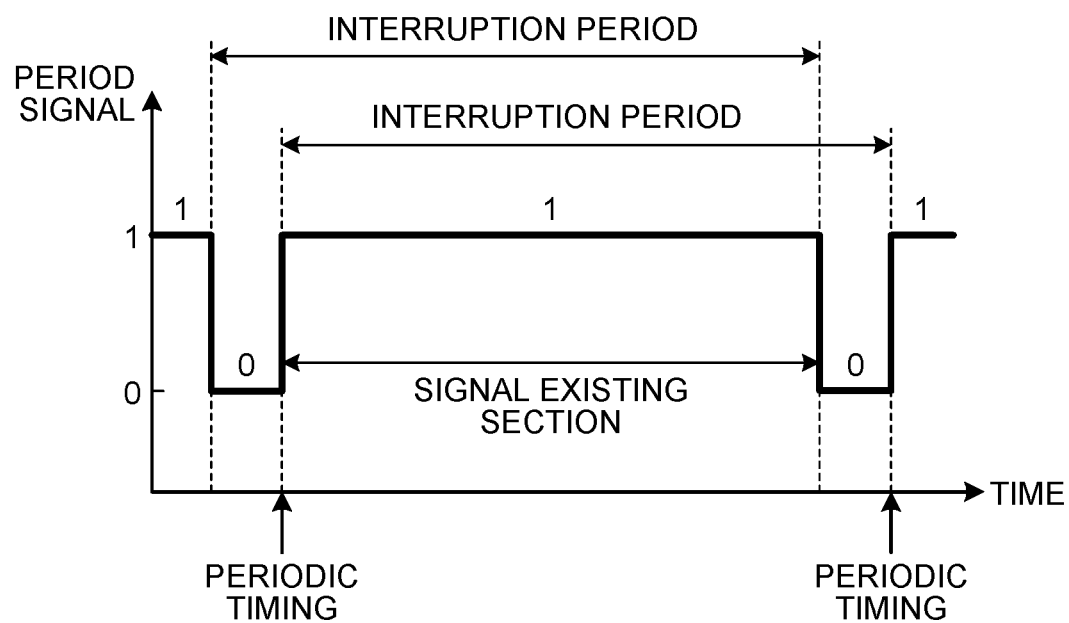
FIG. 23 is a chart illustrating an example of a period signal generated by the period signal generation unit in the receiving device according to the fifth embodiment when the internal state is a period-identified state.

The period signal generation unit 701 generates a period signal that indicates the period of interruption of a signal from the communication satellite 104 in the receiving device 200d, using the internal state, the interruption period, the periodic timing, and the signal existing section obtained from the period estimation unit 230 (step S91). Specifically, when the internal state is the period seeking state, the period signal generation unit 701 does not use the interruption period, the periodic timing, or the signal existing section, and generates a signal having a fixed value of "1" as the period signal. When the internal state is the period-identified state, the period signal generation unit 701 generates the period signal using the interruption period, the periodic timing, and the signal existing section. FIG. 23 is a chart illustrating an example of the period signal generated by the period signal generation unit 701 in the receiving device 200d according to the fifth embodiment when the internal state is the period-identified state. In FIG. 23, the horizontal axis represents the time, and the vertical axis represents the value of the period signal. Reception, as the interruption period, of the interruption period based on the falling edge period and of the interruption period based on the rising edge period from the period calculation unit 233 of the period estimation unit 230 enables the period signal generation unit 701 to generate a period signal as illustrated in FIG. 23 using the interruption period, the periodic timing, and the signal existing section. An ideal waveform of the period signal illustrated in FIG. 23 is practically similar to the ideal waveform of the determination result in the signal determination unit 220 illustrated in FIG. 6.

The no-signal weighting unit 702 applies a weight to the reception signal using the period signal generated by the period signal generation unit 701 (step S92). Specifically, the no-signal weighting unit 702 determines to apply a weight to a reception signal in a time period in which the period signal has a value of "0" (no signal), and multiplies the reception signal to be weighted, by a weighting factor W, thus to provide weighting. In this regard, the weighting factor W is a parameter, and the weighting factor may have different values when the reception signal is data and when the reception signal is a pilot signal. For example, when the reception signal to be weighted is a pilot signal, setting the weighting factor W as W=0 can mask, to "0", the value in a noise portion in the pilot signal received during a signal non-existing section meaning a section in which the reception signal does not exist. This enables the receiving device 200d to improve accuracy of estimation of transmission channel estimation and/or frequency deviation estimated during demodulation using the pilot signal.

In the fifth embodiment, the receiving device 200d has a hardware configuration similar to the hardware configuration of the receiving device 200 of the first embodiment.

As described above, according to the present embodiment, the receiving device 200d is configured such that the period signal generation unit 701 generates a period signal indicating the period of interruption of the signal, and the no-signal weighting unit 702 applies a weight to a signal that has been received during a time period determined to be "signal non-existing" in the period signal. This enables the receiving device 200d to prioritize the signal received during a signal non-existing section and a signal received during a signal existing section, and to improve demodulation performance as compared to the cases of the first through fourth embodiments.

Sixth Embodiment

In a sixth embodiment, the transmission control unit 310 in the transmission device 300 described in the fourth embodiment performs time diversity transmission when the burst signal length obtained from the signal existing section is less than a minimum burst signal length determined based on the transmission frame format. Differences from the fourth embodiment will be described below.

The transmission device 300 of the sixth embodiment is configured similarly to the transmission device 300 of the fourth embodiment, i.e., the transmission device 300 of the first embodiment illustrated in FIG. 8. However, the transmission device 300 is configured, similarly to the case of the fourth embodiment, such that the transmission control unit 310 further receives the signal constantly existing flag $F_{avail}$ and the signal constantly non-existing flag $F_{mask}$ from the receiving device 200c.

Figure 24:
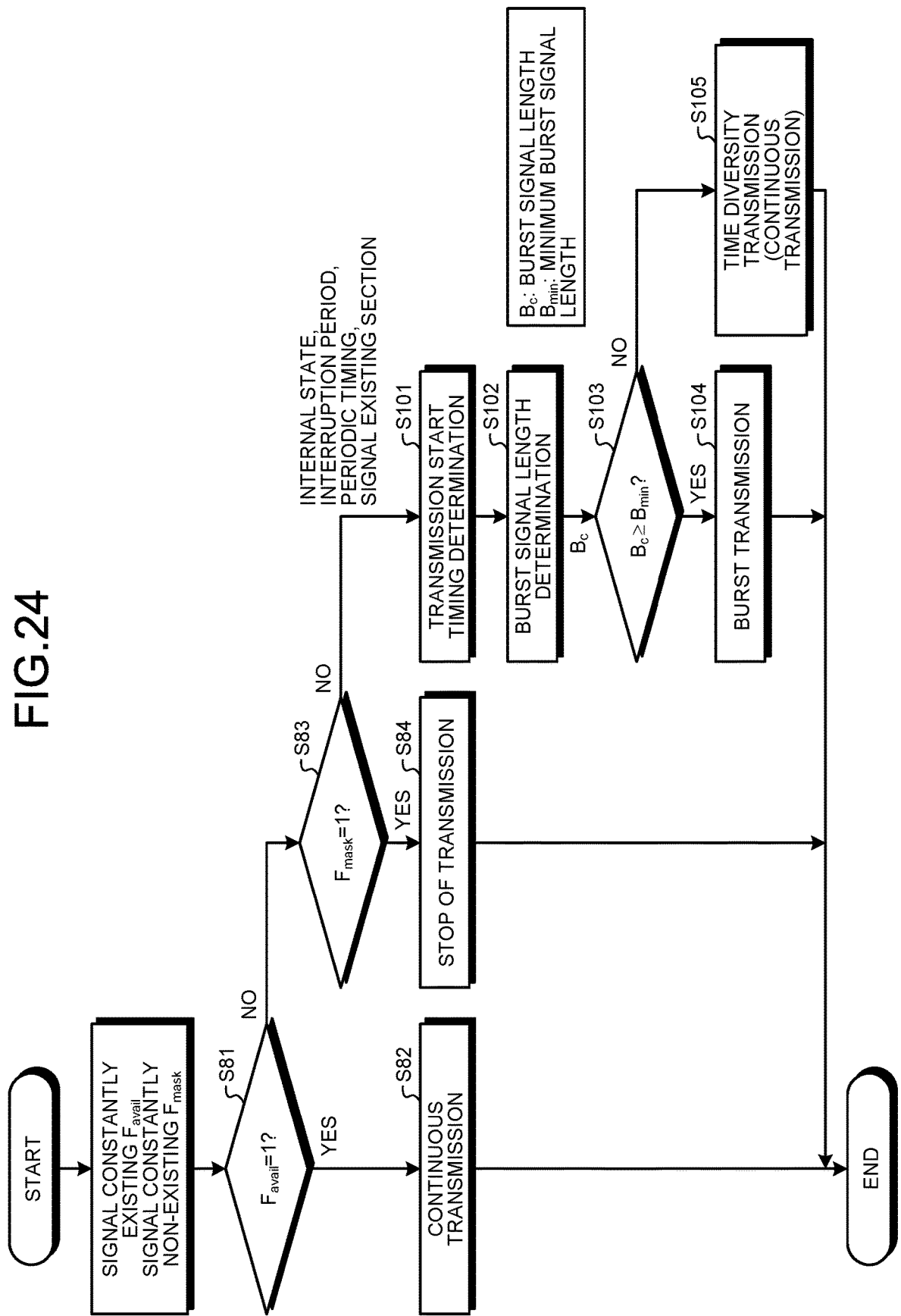
FIG. 24 is a flowchart illustrating a transmission control operation in the transmission control unit of the transmission device according to a sixth embodiment.

FIG. 24 is a flowchart illustrating a transmission control operation in the transmission control unit 310 of the transmission device 300 according to the sixth embodiment. The operations of steps S81 to S84 in the flowchart illustrated in FIG. 24 are similar to the corresponding operations in the fourth embodiment illustrated in the flowchart of FIG. 20. In a case of reception of the signal constantly existing flag $F_{avail}$ having a value of "0" (step S81: No) and of reception of the signal constantly non-existing flag $F_{mask}$ having a value of "0" (step S83: No), the transmission control unit 310 determines that the signal is periodically interrupted, and thus firstly determines the transmission start timing (step S101). The transmission control unit 310 determines the transmission start timing, as described above, in a similar manner to the determination method at step S21 illustrated in the flowchart of FIG. 9 described in the first embodiment, or to the determination method at step S85 illustrated in the flowchart of FIG. 20 described in the fourth embodiment.

Figure 25:
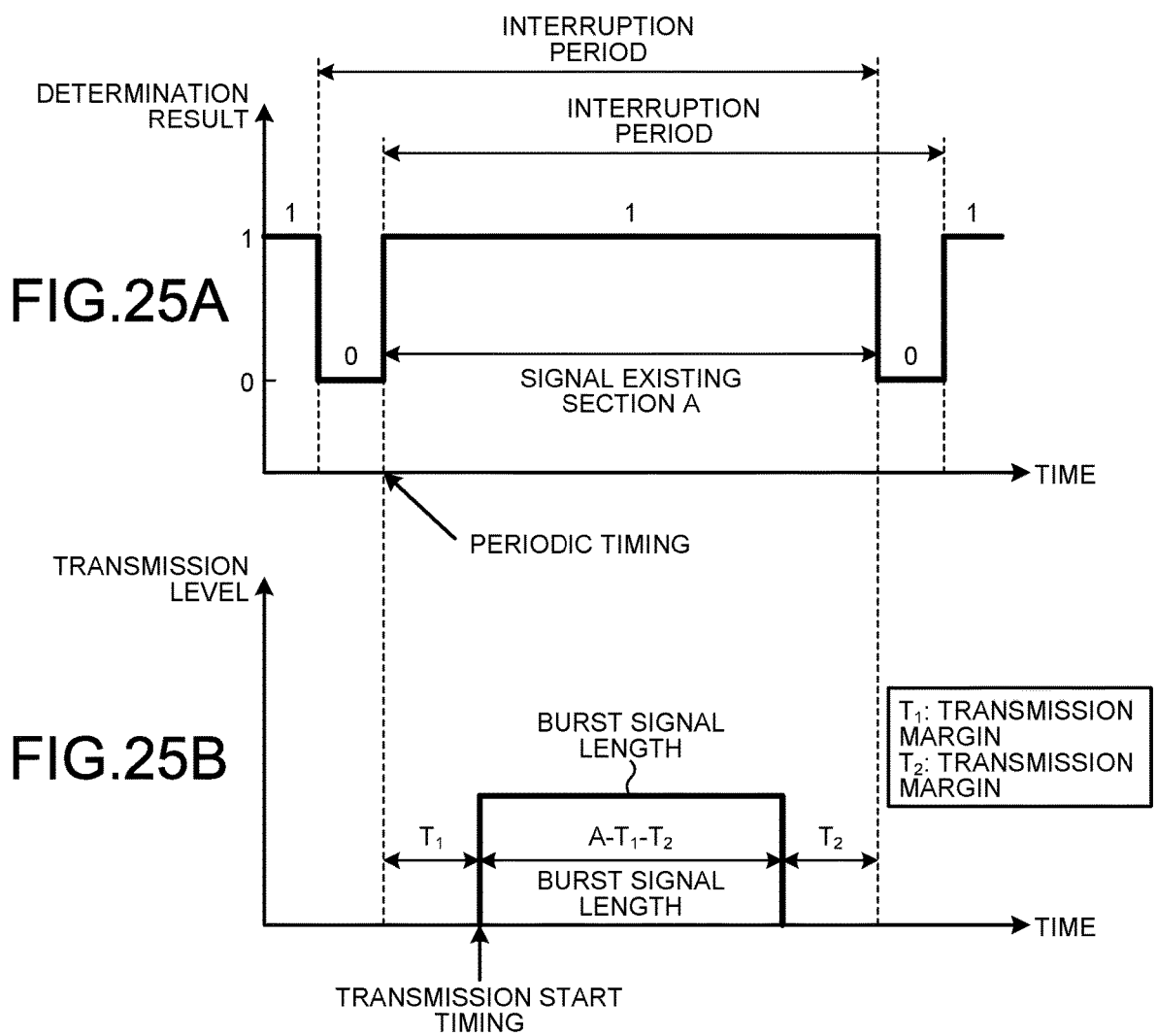
FIGS. 25A and 25B are a set of charts illustrating a method for determining a burst signal length in the transmission control unit according to the sixth embodiment.

The transmission control unit 310 determines the length of the transmission signal, i.e., the burst signal length (step S102). The transmission control unit 310 determines the burst signal length using, for example, the method illustrated in FIGS. 25A and 25B. FIGS. 25A and 25B are a set of charts illustrating a method for determining a burst signal length in the transmission control unit 310 according to the sixth embodiment. FIG. 25A is a chart illustrating the determination result; and the horizontal axis represents the time, and the vertical axis represents the value of the determination result. FIG. 25B is a chart illustrating the burst signal; and the horizontal axis represents the time, and the vertical axis represents the transmission level of the burst signal. In the transmission control unit 310, the relationship illustrated in FIG. 25A can be obtained from the interruption period, the periodic timing, and the signal existing section that have been obtained. The transmission control unit 310 determines the burst signal length using a signal existing section A illustrated in FIG. 25A. For example, as illustrated in FIG. 25B in the lower portion of FIGS. 25A and 25B, the transmission control unit 310 sets a transmission margin of a time period $T_1$ before the signal existing section A and a transmission margin of a time period $T_2$ after the signal existing section A, with respect to the signal existing section A, and then calculates the burst signal length of $B_c = A - T_1 - T_2$ to determine the burst signal length. The transmission margin of a time period $T_1$ provided before the signal existing section A is a first time margin, and the transmission margin of a time period $T_2$ provided after the signal existing section A is a second time margin. Note that the transmission control unit 310 may control the transmission level of the burst signal illustrated in FIG. 25B to output the burst signal at a predetermined transmission level, or change the transmission level depending on the burst signal length and output the resultant burst signal.

The transmission control unit 310 compares the burst signal length $B_c$ determined, with a minimum burst signal length $B_{min}$ (step S103), where the minimum burst signal length $B_{min}$ represents the minimum transmittable burst signal length. If a relationship of [burst signal length $B_c$]≥[minimum burst signal length $B_{min}$] holds (step S103: Yes), the transmission control unit 310 determines to perform burst transmission operation using a transmission signal having the burst signal length $B_c$, i.e., a burst signal (step S104). The transmission control unit 310 generates a control signal including the transmission start timing and the burst signal length $B_c$ that have been determined, and indicating burst transmission, and outputs the control signal to the transmission signal generation unit 320. If a relationship of [burst signal length $B_c$]<[minimum burst signal length $B_{min}$] holds (step S103: No), the transmission control unit 310 determines to sequentially transmit a burst signal through time diversity transmission (step S105). The transmission control unit 310 generates a control signal including the transmission start timing and the burst signal length $B_c$ that have been determined, and indicating time diversity transmission, and outputs the control signal to the transmission signal generation unit 320. The time diversity transmission can be implemented by, for example, the transmission device 300 by repeatedly transmitting a signal in units of transmission signals having a length less than or equal to the signal existing section A. This may enable the reception-side device, e.g., the communication satellite 104 in the example of FIG. 1, to receive a signal through diversity combining even when the signal is interrupted.

As described above, according to the present embodiment, the transmission control unit 310 provides control to perform continuous transmission by time diversity transmission when the burst signal length obtained is less than the minimum burst signal length. This enables the communication device 100 to provide efficient signal transmission when burst transmission cannot be provided to avoid interruption.

Seventh Embodiment

In a seventh embodiment, the transmission control unit 310 controls signal transmission by allocating a symbol having a higher required received power, i.e., higher required signal-to-noise ratio (SNR) in a center of the burst signal, and allocating a symbol having a lower required SNR in a front half portion and in a rear half portion of the burst signal with respect to the length of the transmission signal determined, i.e., the burst signal length of the burst signal. This is applicable to any one of the first through sixth embodiments, but, by way of example, a case of application to the first embodiment will be described below focusing on differences from the first embodiment.

Figure 26:
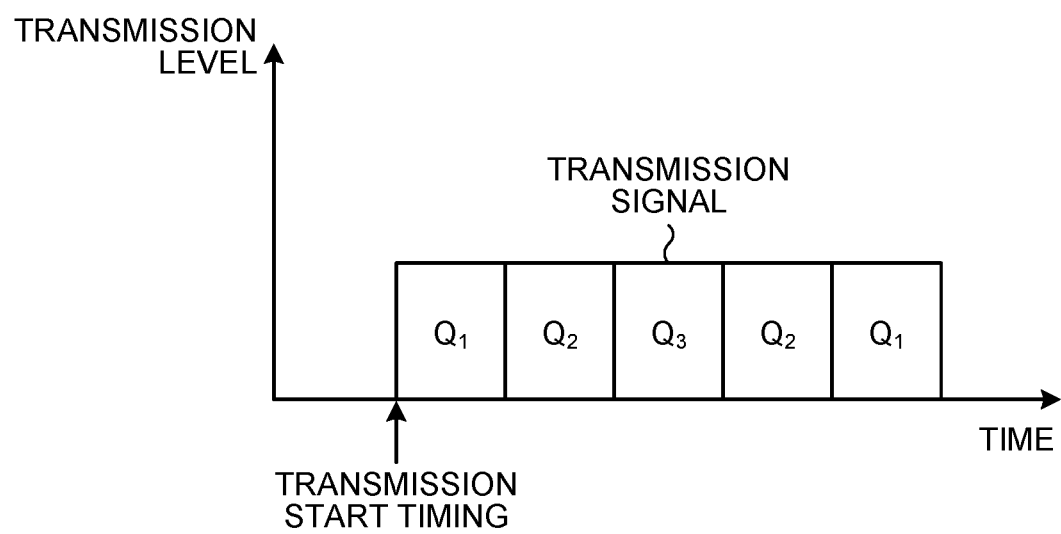
FIG. 26 is a diagram illustrating an example of symbol allocation by transmission control of the transmission control unit in the transmission device according to a seventh embodiment.

The transmission device 300 of the seventh embodiment is configured similarly to the transmission device 300 of the first embodiment illustrated in FIG. 8. In the transmission device 300, when, for example, a signal has symbols $Q_1$, $Q_2$, and $Q_3$ having different required SNR values, and the required SNR values satisfy a relationship $Q_1 < Q_2 < Q_3$, the transmission control unit 310 allocates the symbol $Q_3$ in the center of the burst signal, the symbol $Q_2$ before and after the symbol $Q_3$, and the symbol $Q_1$ at the head and tail of the burst signal as illustrated in FIG. 26. That is, the transmission control unit 310 allocates a symbol having a higher required SNR in the center of the burst signal, and allocates a symbol having a lower required SNR in the front half and in the rear half of the burst signal. The transmission control unit 310 generates a control signal indicating the symbol allocation determined, and outputs the control signal to the transmission signal generation unit 320.

FIG. 26 is a diagram illustrating an example of symbol allocation by transmission control of the transmission control unit 310 in the transmission device 300 according to the seventh embodiment. In FIG. 26, the horizontal axis represents the time, and the vertical axis represents the transmission level of the burst signal. The transmission device 300 determines the symbol allocation in a burst signal to be in order of $Q_1$, $Q_2$, $Q_3$, $Q_2$, and $Q_1$. This causes the receive-side device, e.g., the communication satellite 104 in the example of FIG. 1, to have the signal affected by interruption with a probability of $Q_1 > Q_2 > Q_3$, and thus the average SNR values satisfy a relationship of $Q_1 < Q_2 < Q_3$. The transmission control unit 310 allocates a symbol having a lower required SNR in the front half and in the rear half of a burst signal where interruption is more likely to occur, and allocates a symbol having a higher required SNR in the center of the burst signal where interruption is less likely to occur, thereby enabling an effect of interruption to be reduced, and efficient communication to be provided even when, for example, the interruption period, the periodic timing, and the signal existing section estimated in the period estimation unit 230 have an error.

As described above, according to the present embodiment, the transmission control unit 310 allocates a symbol having a higher required SNR in the center of a burst signal, and allocates a symbol having a lower required SNR in the front half and in the rear half of the burst signal. This enables the communication device 100 to allocate symbols depending on required SNR values thereof thus to provide efficient transmission.

A communication device according to the disclosure provides an advantage in being capable of improving accuracy of estimation of the period, or cycle period, of interruption of a communication channel.

The configurations described in the foregoing embodiments are merely examples. These configurations may be combined with a known other technology, and moreover, a part of such configurations may be omitted and/or modified without departing from the spirit.

What is claimed is:

1. A communication device comprising:
   a signal determiner to determine whether there is a reception signal or not; and
   a period estimator to estimate an interruption period of interruption of a signal transmitted from a device that is a source of the reception signal, using a determination result from the signal determiner, wherein
   the period estimator includes
   a differential operator to calculate a differential value of the determination result,
   a masking operator to calculate a provisional period of the interruption period using the differential value, to control use of the differential value and of the provisional period based on an internal state representing an operational state of the period estimator, and to output the provisional period to be used,
   a period calculator to calculate the interruption period using the provisional period output from the masking operator,
   a signal existing section calculator to calculate a signal existing section referring to a section in which the reception signal exists, using the provisional period output from the masking operator,
   a periodic timing estimator to estimate periodic timing representing timing of a change, in the determination result, from a section in which the reception signal does not exist to the signal existing section, using the provisional period output from the masking operator and using the signal existing section, and
   a state determiner to determine the internal state using the interruption period.

2. The communication device according to claim 1, wherein
   the internal state has two states that are a period seeking state being a state in which the interruption period is not identified in the period estimator and a period-identified state being a state in which the interruption period is identified in the period estimator, and
   the period estimator specifies
   the period seeking state as an initial state,
   that a transition condition from the period seeking state to the period-identified state is that the interruption period for a predetermined number of previous cycles falls within a predetermined range including a reference period, where the reference period is a latest interruption period calculated by the period calculator, and
   that a transition condition from the period-identified state to the period seeking state is that the identified period is not updated even after a time period elapses since an update time of an identified period, where the time period is a predetermined factor times the identified period and the identified period is an interruption period calculated in the period-identified state.

3. The communication device according to claim 2, wherein
   the masking operator does not use the provisional period when the internal state is the period seeking state and the provisional period is out of range from a predetermined minimum period to a predetermined maximum period, and does not use the provisional period when the internal state is the period-identified state and the provisional period is out of a predetermined range including the identified period.

4. The communication device according to claim 2, wherein
   the period estimator includes
   an averager to average the determination result or an input value using the identified period when the internal state is the period-identified state.

5. The communication device according to claim 2, wherein
   the period estimator includes
   a smoother to smooth the determination result or an input value based on a predetermined number of times of smoothing.

6. The communication device according to claim 5, wherein
   the smoother executes a smoothing loop L times on the determination result or on the input value at time t, and in processing of an n-th smoothing loop, corrects a state "signal non-existing" at time t to a state "signal existing" in a case in which determination results or input values at time t-n, time t, and time t+1 are respectively "signal existing", "signal non-existing", and "signal existing", and corrects a state "signal existing" at time t to a state "signal non-existing" in a case in which the determination results or the input values at time t-n, time t, and time t+1 are respectively "signal non-existing", "signal existing", and "signal non-existing", where time t has a discretized value of time when the determination result is output from the signal determiner, and the value L is an integer greater than or equal to 1, and the value n is an integer ranging from 1 to L, inclusive.

7. The communication device according to claim 2, wherein
the period estimator includes
a period averager to average the interruption period when the internal state is the period-identified state.

8. The communication device according to claim 2, wherein
the period estimator includes
a periodic timing averager to average the periodic timing when the internal state is the period-identified state.

9. The communication device according to claim 2, wherein
the period estimator includes
a signal existing section averager to average the signal existing section when the internal state is the period-identified state.

10. The communication device according to claim 1, wherein
the period estimator includes
a non-periodicity determiner to generate, based on the determination result, a signal constantly existing flag indicating whether the signal is being continuously received and a signal constantly non-existing flag indicating whether the signal is being continuously unreceived.

11. The communication device according to claim 1, comprising:
a period signal generator to generate a period signal indicating a period of interruption of the signal using the interruption period, the signal existing section, the periodic timing, and the internal state; and
a no-signal weight applier to apply a weight to the signal that is received during a time period determined to be "signal non-existing" in the period signal.

12. The communication device according to claim 2, comprising:
a transmission controller to provide control to transmit a burst signal having a burst signal length less than a length of the signal existing section when the internal state is the period-identified state.

13. The communication device according to claim 10, comprising:
a transmission controller to provide control to continuously transmit a signal from the communication device in a case of reception, from the non-periodicity determiner, of a signal constantly existing flag indicating that the signal is being continuously received.

14. The communication device according to claim 10, comprising:
a transmission controller to provide control to stop transmission of a signal from the communication device in a case of reception, from the non-periodicity determiner, of a signal constantly non-existing flag indicating that the signal is being continuously unreceived.

15. The communication device according to claim 12, wherein
the transmission controller sets a first time margin before the signal existing section, sets a second time margin after the signal existing section, and determines the burst signal length to be a length of a time zone that is obtained by removing the first time margin and of the second time margin from the signal existing section.

16. The communication device according to claim 15, wherein
the transmission controller provides control to sequentially transmit the burst signal by time diversity transmission when the burst signal length obtained is less than a minimum transmittable burst length.

17. The communication device according to claim 15, wherein
the transmission controller allocates a symbol having a higher required received power in a center of the burst signal, and allocates a symbol having a lower required received power in a front half and in a rear half of the burst signal.

18. A method for predicting interruption comprising:
a signal determination of determining whether there is a reception signal or not; and
a period estimation of estimating an interruption period of interruption of a signal transmitted from a device that is a source of the reception signal, using a determination result, wherein
the period estimation includes
calculating a differential value of the determination result,
calculating a provisional period of the interruption period using the differential value, controlling use of the differential value and of the provisional period based on an internal state representing an operational state estimating the interruption period, and outputting the provisional period to be used,
calculating the interruption period using the provisional period,
calculating a signal existing section referring to a section in which the reception signal exists, using the provisional period,
estimating periodic timing representing timing of a change, in the determination result, from a section in which the reception signal does not exist to the signal existing section, using the provisional period and using the signal existing section, and
determining the internal state using the interruption period.

19. A control circuit for controlling a communication device, wherein, in estimating an interruption period of interruption of a signal transmitted from a device that is a source of the reception signal, using a determination result indicating whether there is a reception signal or not, the control circuit causes the communication device to perform:
calculating a differential value of the determination result,
calculating a provisional period of the interruption period using the differential value, controlling use of the differential value and of the provisional period based on an internal state representing an operational state estimating the interruption period, and outputting the provisional period to be used,
calculating the interruption period using the provisional period,
calculating a signal existing section referring to a section in which the reception signal exists, using the provisional period,
estimating periodic timing representing timing of a change, in the determination result, from a section in which the reception signal does not exist to the signal existing section, using the provisional period and using the signal existing section, and
determining the internal state using the interruption period.

20. A non-transitory program recording medium storing therein a program for controlling a communication device, wherein, in estimating an interruption period of interruption of a signal transmitted from a device that is a source of the reception signal, using a determination result indicating whether there is a reception signal or not, the program causes the communication device to execute:

calculating a differential value of the determination result, calculating a provisional period of the interruption period using the differential value, controlling use of the differential value and of the provisional period based on an internal state representing an operational state estimating the interruption period, and outputting the provisional period to be used, calculating the interruption period using the provisional period, calculating a signal existing section referring to a section in which the reception signal exists, using the provisional period, estimating periodic timing representing timing of a change, in the determination result, from a section in which the reception signal does not exist to the signal existing section, using the provisional period and using the signal existing section, and determining the internal state using the interruption period.

\* \* \* \* \*